(12) United States Patent
Hatchue et al.

(10) Patent No.: US 12,413,589 B2
(45) Date of Patent: Sep. 9, 2025

(54) SYSTEMS AND METHODS FOR AUTHENTICATING CLIENTS TO ACCESS DATA

(71) Applicant: Stripe, Inc., South San Francisco, CA (US)

(72) Inventors: Gael Hatchue, Oakland, CA (US); Michael Bayles, Rogers, MN (US); Benjamin Mays, Austin, TX (US); Karla Burnett, Bondi Junction (AU); Frank Huang, San Mateo, CA (US); Michael Chang, Round Rock, TX (US)

(73) Assignee: Stripe, Inc., South San Francisco, CA (US)

( * ) Notice: Subject to any disclaimer, the term of this patent is extended or adjusted under 35 U.S.C. 154(b) by 97 days.

(21) Appl. No.: 18/536,144

(22) Filed: Dec. 11, 2023

(65) Prior Publication Data
US 2025/0193185 A1   Jun. 12, 2025

(51) Int. Cl.
*G06F 21/00* (2013.01)
*H04L 9/40* (2022.01)

(52) U.S. Cl.
CPC ........ *H04L 63/0884* (2013.01); *H04L 63/083* (2013.01)

(58) Field of Classification Search
CPC .......................... H04L 63/0884; H04L 63/083
See application file for complete search history.

(56) References Cited

U.S. PATENT DOCUMENTS

| | | | |
|---|---|---|---|
| 8,418,233 B1 * | 4/2013 | Hughes | H04L 63/105 |
| | | | 713/153 |
| 10,868,855 B2 * | 12/2020 | Achyuth | H04L 67/08 |
| 11,579,783 B1 * | 2/2023 | David | H04L 9/14 |
| 12,282,920 B1 * | 4/2025 | Katzin | G06Q 10/067 |
| 12,294,650 B2 * | 5/2025 | Coffing | H04L 63/101 |
| 2017/0111444 A1 * | 4/2017 | Saheba | H04L 67/1012 |
| 2022/0004655 A1 * | 1/2022 | Zhang | G06F 21/107 |
| 2023/0163967 A1 * | 5/2023 | Cannata, Jr. | H04L 9/3263 |
| | | | 713/156 |

* cited by examiner

*Primary Examiner* — Kendall Dolly
(74) *Attorney, Agent, or Firm* — Foley & Lardner LLP

(57) ABSTRACT

Presented herein are systems and methods of authenticating clients to access data via proxy layers. A gateway on a proxy layer may receive a request from a client to access data in a compartment on the database layer. The request may include a token based at least on an encryption of an identifier of the compartment responsive to successful authentication of the request at an application layer. The gateway may, responsive to identifying the identifier as referencing the compartment, determine that the client is authorized to access the data in the compartment on the database layer through the proxy layer. The gateway may select a permission for the client to access the compartment through the proxy layer based on the context of the request. The gateway may generate an indication that the client is authorized to access the data in accordance with the permission.

20 Claims, 14 Drawing Sheets

SYSTEMS AND METHODS FOR AUTHENTICATING CLIENTS TO ACCESS DATA

TECHNICAL FIELD

This application relates generally to methods and systems for authenticating clients to access data using secure context tokens.

BACKGROUND

A database system architecture may include a multitude of components and functions arranged across a set of abstraction layers interface and communicating with one another to perform aggregation, storage, and transformation of data. The database system architecture may also regulate and control access to the data, such as a login protocol for the user to enter authentication credentials to gain access to the platform. However, there may be a myriad of challenges in controlling access to the data in this setup. In one example, a malicious entity may be able to illicit access to the data by using a previously authorized user's authentication credentials, resulting in a breach of data and undesired exfiltration. In another example, a user of the platform may be granted access to a portion of the data as specified by access permissions but attempt to circumvent these measures to access restricted data inappropriately. These problems may be exacerbated in the context of the database architecture due to the complexity and number of components and functions across the different layers, each potentially being a weak point in securing data from being improperly accessed and exfiltrated.

SUMMARY

Presented herein are systems and methods to authenticate clients to access data through a proxy layer using secure context tokens. A database system may include a set of layers in accordance with an architecture, such as an application layer, a proxy layer, and a database layer, to manage storage and control access to data. The application may include an application or service interfacing with a client accessing the database system. The proxy layer may logically reside between the application layer and the database layer and may route communications from the application to a compartment on the database layer, and vice-versa. The database layer may include physical or virtual resources to run and maintain a set of compartments storing data, as well as perform indexing of the data on the databases.

A client attempting to access the data through the database system may interface with an application or a service on the application layer by sending a request to access with authentication credentials. The request to access may be to read or write to the data on the database. The application on the application layer may perform initial authentication on the client based on the request. When the authentication is successful, the application may pass on the request to the proxy layer of the database system. The proxy layer may route the request to a database on the database layer to process the request. The database layer, in turn, may return an indication of the access operation to the proxy layer. The proxy layer, in turn, may route the response to the application layer. The application on the application layer may forward the response to the client.

Although this approach does allow the client to access the data on the database layer, there are a number of technical shortcomings and weaknesses in maintaining security over the data without any additional checks past the application layer. For example, if a malicious entity is able to pass through the initial authentication check at the application layer using an authorized user's authentication credentials, there may be no additional layers of security, resulting in a security lapse. Moreover, even if it is an authorized entity that passes through the application layer, such an entity may be able to access data that is otherwise restricted to the entity, because of the lack of control at the successive layers of the database system.

To address these and other technical challenges, a gateway on the proxy layer may be configured to control access to data on the database layer to file access requests passing through the application layer. When a request from a client is authenticated at the application layer, a token (also herein referred to as secure context) may be included in the request to identify which compartment on the database layer to access. Upon receipt at the proxy layer, the gateway may extract the token from the request and determine whether the identifier in the token matches an identifier of the compartment. Based on the determination, the gateway may grant or restrict access to the data on the database layer. When the client is to be granted access, the gateway may generate another token to send to the client to indicate authorization to access the database. Having the gateway perform this additional check may provide the advantage of providing multiple layers of control between the client and the compartment. In addition, the token may be on a per compartment or resource basis rather than a user or device basis, providing more granular control over which data the client is able to access, thereby improving data security.

In addition, the token provided to the client to grant access may be generated to allow the token to be extended beyond the initial expiration time. An initial issuer (e.g., the gateway or another service) may have generated a token for a client, with a signature encrypted by the initial issuer and an identifier referencing databases permitted to be accessed by the client. To extend the use of the token beyond the initial expiration time, the client may send the token to a trusted service. The trusted service may have received a shared secret (e.g., an encryption key) from the initial issuer to designate the service as trusted. The trusted service may decrypt the signature from the token to validate. Upon successful validation, the trusted service may generate a new token with the signatures from the service and the shared secret of the initial issuer, and provide the new token to the client, thereby permitting the use of the token beyond the original expiration time. In this manner, the utility of the token may be extended beyond the initial expiration time in a secure manner to prevent the usage of fraudulent tokens. Furthermore, from a human-computer interaction (HCI) perspective, the extension may reduce the frequency of having a user of the client enter an authentication credential each time the client is to access the data on the database.

Aspects of the present disclosure may be directed to systems and methods of authenticating clients to access data via proxy layers. A gateway on a proxy layer between an application layer and a database layer may receive a request from a client to access data in a compartment of plurality of compartments on the database layer. The request may include (i) a context in which the client is to access the compartment and (ii) a token generated based at least on an encryption of an identifier of the compartment responsive to successful authentication of the request at the application layer. The gateway may, responsive to identifying the identifier decrypted from the token of the request corresponding to the compartment of the plurality of compartments, determine that the client is authorized to access the data in the compartment on the database layer through the proxy layer. The gateway may select, from a plurality of access permissions defined by the proxy layer to control access to database layer, at least one access permission for the client to access the compartment through the proxy layer based on the context of the request. The gateway may generate, to provide the client via the application layer, an indication that the client is authorized to access the data in the compartment on the database layer through the proxy layer in accordance with the at least one access permission.

In one embodiment, the gateway may determine that a second client is not authorized to access the data in the compartment through the proxy layer, responsive to identifying a second token of a second request from the second client as not corresponding to the compartment. The gateway may generate, to provide the second client via the application layer, an indication that second client is not authorized to access the data in the compartment on the database layer.

In another embodiment, the gateway may identify the at least one access permission, based on an element in which the data is stored on the compartment of the database layer. The gateway may send a response to indicate granting of the at least one access permission to the client in accessing the data in the compartment on the database.

In yet another embodiment, the gateway may generate a second token to include (i) the context, (ii) an encryption of the identifier of the compartment, and (iii) an identifier of the client, responsive to determining that the client is authorized to access the data. The gateway may send a response including the second token to grant the client access the data in the compartment on the database layer.

In yet another embodiment, the gateway may extract the identifier from the token of the request by decrypting the identifier of the compartment using an encryption key shared between the application layer and the gateway layer. The gateway may identify the identifier decrypted from the token as referencing the compartment of the plurality of compartments as identified by the context.

In yet another embodiment, the gateway may determine that the identifier decrypted from the token of the request references the compartment not associated with the gateway. The gateway may communicate the token with an external service to determine that the client is authorized to access the data in the compartment.

In yet another embodiment, the gateway may receive, via the application layer, the request including the token added to a header of the request responsive to the authentication of the request at the application layer. In yet another embodiment, the gateway may identify the at least one access permission, independent of any access permission granted at the application layer responsive to successful authentication of the request at the application layer.

In yet another embodiment, the token may be issued by a first service to access the plurality of compartments, and may have an expiration deadline extendable by a second service, by using a shared key between the first service and the second service. In yet another embodiment, each compartment of the plurality of compartments may include a plurality of elements. Each element of the plurality of elements may include at least one of (i) the identifier of the compartment to which the element belongs and (ii) an identifier of the gateway through which the element is to be accessed.

Aspects of the present disclosure may be directed to systems and methods of generating tokens to grant clients access to data. A first service may receive a first token issued by a second service to grant a client access to data on a plurality of databases prior to an expiration deadline. The first token may include (i) a first signature encrypted by the second service and (ii) an identification of the plurality of databases accessible using the first token. The first service may determine that the first token is valid based on successful identification of the first signature decrypted from the first token using a shared key from the second service. Responsive to determining that the first token is valid, the first service may generate a second signature using an encryption key of the first service and generate a third signature using the shared key of the second service. The first service may generate a second token derivative of the first token, to include (i) the second signature of the first service, (ii) the third signature generated from the shared key of the second service, and (iii) the identification of the plurality of databases accessible using the second token. The first service may send the second token to grant the client access to the data on the plurality of databases beyond the expiration deadline of the first token.

In one embodiment, the first service may, responsive to determining that a third token is invalid based on unsuccessful identification of a third signature from the third token using the shared key of the second service, send a second response indicating a failure to validate the third token for continued access of the data on the plurality of databases. In another embodiment, the first service may determine a time elapsed since the issuance of the first token is within a threshold limit for reactivation, the threshold limit greater than at least the expiration time of the first token. The first service may generate the second token, responsive to determining that the elapsed time is within the time limit for reactivation.

In yet another embodiment, the first service may determine that the first token is valid, responsive to identifying the second service as associated with the shared key used to identify the first signature. In yet another embodiment, the first service may receive the first token including the first signature, subsequent to removal by the second service of a third signature originally in the first token. In yet another embodiment, each database of the plurality of databases may correspond to a respective compartment of a plurality of compartments on a database layer. In yet another embodiment, each of the first token and second token may grant the client access to the data on the plurality of databases on a database layer via a proxy layer.

Aspects of the present disclosure may be directed to systems and methods of deactivating tokens to control access to data. A first service may receive a request to deactivate a first token granting a client access to data on a plurality of database. The first token may include: (i) a first signature generated using a symmetric encryption key and (ii) a second signature generated using an asymmetric encryption key. The first service may identify, from the first token, the second signature as generated using the asymmetric encryption key. The first service may determine, using the request, the plurality of databases accessible by the client using the first token. The first service may generate a second token derivative of the first token by including (i) the first signature encrypted using the first key and (ii) an identification of the plurality of databases and by modifying the second signature identified as generated using the asymmetric encryption key. The first service may store the second token on a storage accessible to the client and the plurality of databases, the second token having an expiration time configurable to be extended by a second service using a shared key.

In one embodiment, the first service may store the shared key to a plurality of trusted services including the second service, the second service configured to reactivate the second token using the shared key. In another embodiment, the first service may identify the plurality of databases from a context in which the client is to access the data on the plurality of databases. In yet another embodiment, the first service may generate the shared key to include a third signature generated using the shared key.

In yet another embodiment, the first token may include (i) the expiration time defining a first length of time during which the plurality of databases is accessible using the first token and (ii) a threshold time limit greater than the expiration time defining a second length of time after which the first token is not extendable. In yet another embodiment, each database of the plurality of databases may correspond to a respective compartment of a plurality of compartments on a database layer. In yet another embodiment, the first token may grant the client access to the data on the plurality of databases on a database layer via a proxy layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate embodiments of the subject matter disclosed herein.

DETAILED DESCRIPTION

Figure 1:
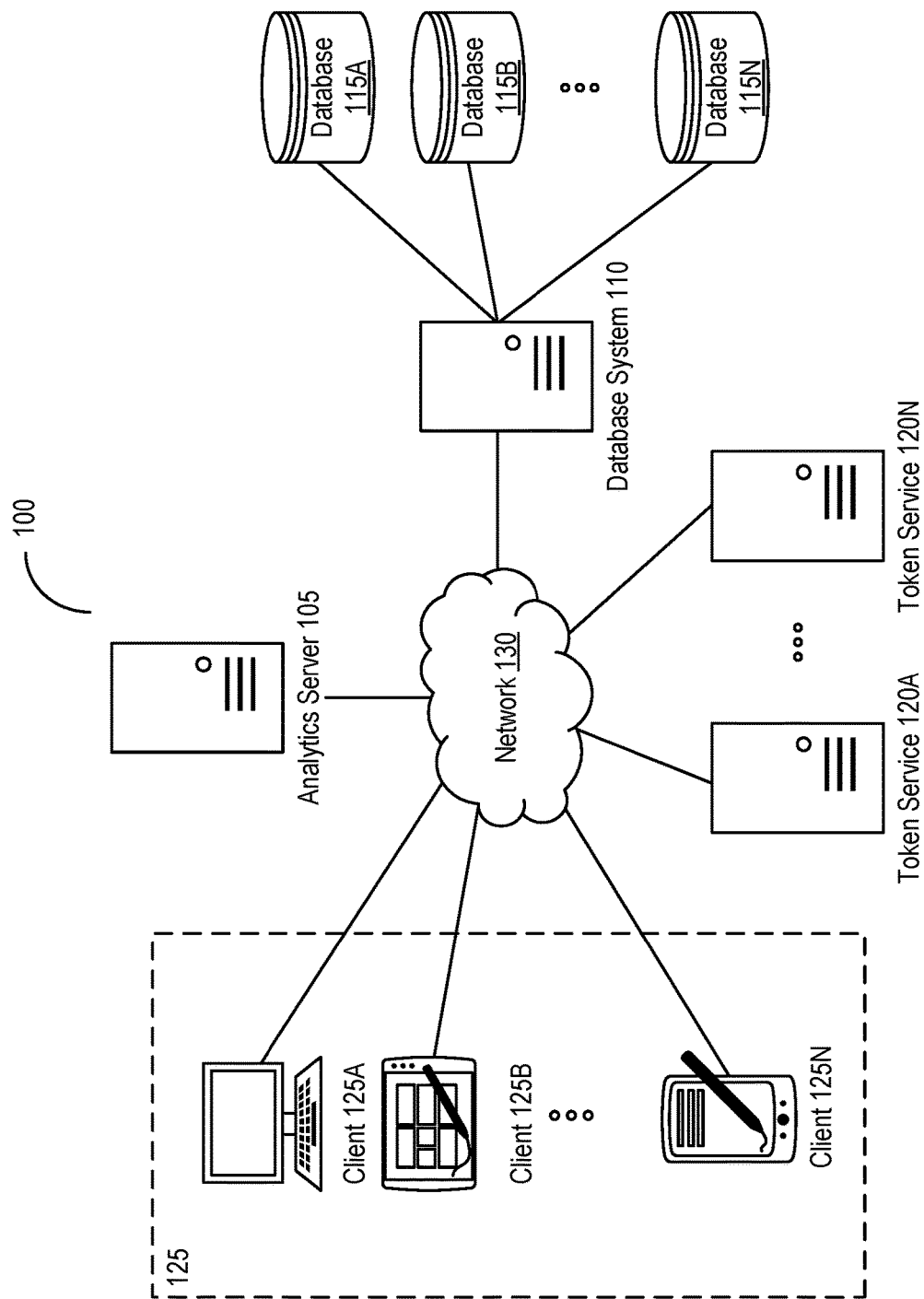
FIG. 1 illustrates a block diagram of a computing system for authenticating clients to access data using tokens, in accordance with an embodiment.

Reference will now be made to the illustrative embodiments illustrated in the drawings, and specific language will be used here to describe the same. Nevertheless, it will be understood that no limitation of the scope of the claims or this disclosure is intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is described here in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 illustrates a block diagram of a system 100 for authenticating clients to access data using tokens. The system 100 may include at least one analytics server 105, at least one database system 110, a set of databases 115A-N (hereinafter generally referred to as databases 115), one or more token services 120A-N (hereinafter generally referred to as token services 120), and one or more clients 125A-N (hereinafter generally referred to as clients 125), among others, communicatively coupled with one another via at least one network 130. In some embodiments, the database system 110 may be part of the analytics server 105. In some embodiments, the token service 120 may be part of the analytics server 105 or the database system 110.

The analytics server 105 may utilize features described herein to retrieve data and generate/display results, such as via a platform displayed on various devices. The analytics server 105 may be communicatively coupled to the database system 110, the token service 120, and the clients 125. The analytics server 105 can receive information requests (e.g., information queries or requests for information) from the user devices 125. The analytics server can iteratively execute computer models and applications to generate data queries to query the data sources to generate results in response to the information requests. The system 100 is not confined to the components described herein and may include additional or other components not shown for brevity, which are to be considered within the scope of the embodiments described herein.

The analytics server 105 may generate and display an electronic platform (e.g., an information generation platform that is sometimes referred to as a platform) on any device discussed herein. The platform may be configured to receive requests for recommendations of fault simulations to run on a network infrastructure and automatically output sets of faults in response to such requests. For instance, the electronic platform may include one or more graphical user interfaces (GUIs) displayed on the client 125. An example of the platform generated and hosted by the analytics server 105 may be a web-based application or a website configured to be displayed on various electronic devices, such as mobile devices, tablets, personal computers, and the like. The platform may include various input elements configured to receive information requests from any of the users and display results in response to such information requests during the execution of the methods discussed herein. The analytics server 105 may iteratively execute the applications to process and generate responses to the information requests.

The analytics server 105 may be any computing device comprising of a processor and non-transitory, machine-readable storage capable of executing the various tasks and processes described herein. The analytics server 105 may employ various processors, such as a central processing unit (CPU) and graphics processing unit (GPU), among others. Non-limiting examples of such computing devices may include workstation computers, laptop computers, server computers, and the like. While the system 100 includes a single analytics server 105, the analytics server 105 may include any number of computing devices operating in a distributed computing environment, such as a cloud environment. The analytics server 105 may be in communication with the database system 110, the token services 120, and the clients 125, among others, via the network 130.

The database system 110 may be any computing device comprising of a processor and non-transitory, machine-readable storage capable of executing the various tasks and processes described herein. The database system 110 may be in communication with the analytics server 105, the token services 120, and the clients 125, among others, via the network 130. In some embodiments, the database system 110 may be situated, located, or otherwise associated with at least one server group. Each server group may correspond to a data center, a branch office, or a site at which a subset of servers is situated or associated. In some embodiments, the database system 110 may be a cloud storage service provider corresponding to a distributed group of servers on a cloud network.

The database system 110 may administer or manage the set of databases 115 (sometimes herein referred to as compartments). Each database 115 may store and maintain data associated with applications and services (e.g., applications interfacing with the clients 125 and other processes). The administration and the management of the databases 115 by the database system 110 may include, for example: supporting applications or services accessing data; regulation and controlling of access of the data; handling requests and queries to the data on the databases 115; and monitoring and instrumenting usage of the data on the databases 115, among others. The database system 110 may be arranged in accordance with a database management architecture. For example, the architecture for the database system 110 may include a set of abstraction layers, such as an application layer, a proxy layer, and a data layer, among others. In some embodiments, the database system 110 may include a database management system (DBMS) to arrange and organize the data maintained across the databases 115.

Each token service 120 may be any computing device comprising of a processor and non-transitory, machine-readable storage capable of executing the various tasks and processes described herein. The token service 120 may be in communication with the analytics server 105, the database system 110, and the clients 125, among others, via the network 130. The set of token services 120 may correspond to a group of mutually trusted services for issuing and managing tokens. Each of the set of token services 120 may issue and generate a token to access the database system 110 (or other services) to the clients 125 upon successful authentication. At least one token service 120 may generate an initial token to grant the client 125 access to the database system 110 (or another service). At least other token service 120 may reactivate the token to extend the granting of the access beyond an initial expiration time for the client 125. The token service 120 may be situated, located, or otherwise associated with at least one server group. Each server group may correspond to a data center, a branch office, or a site at which a subset of servers is situated or associated.

The client 125 may be any computing device comprising of a processor and a non-transitory, machine-readable storage medium capable of performing the various tasks and processes described herein. Non-limiting examples of a user device 125 may be a workstation computer, laptop computer, phone, tablet computer, or server computer. During operation, various users may use one or more of the user devices 125 to access the platform operationally managed by the analytics server 105, the database system 110, and the token service 120, among others. Even though referred herein as "user" devices, these devices may not always be operated by users. A user device 125 may be another computing system that automatically transmits information requests to the analytics server without any user input.

The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums. The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets or another standard or proprietary wireless communication protocol. In another example, the network 130 may also include communications over a cellular network, including, e.g., a GSM (Global System for Mobile Communications), CDMA (Code Division Multiple Access), and/or EDGE (Enhanced Data for Global Evolution) network.

Figure 2:
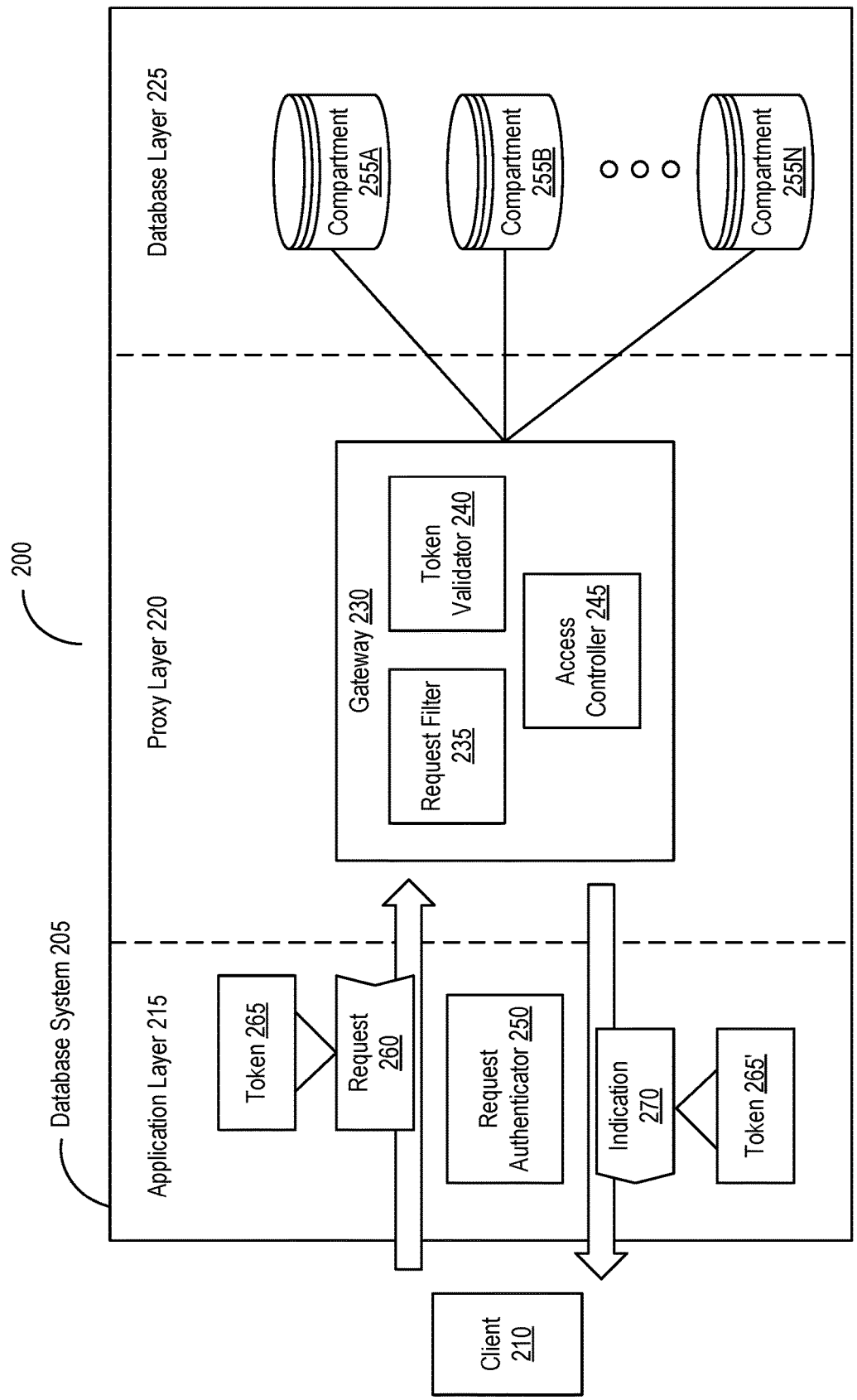
FIG. 2 illustrates a block diagram of a system for authenticating clients to access data via proxy layers, in accordance with an embodiment.

FIG. 2 illustrates a block diagram of a system 200 for authenticating clients to access data via proxy layers. In overview, the system 200 may include at least one database system 205 and at least one client 210. The database system 205 may include at least one application layer 215, at least one proxy layer 220, and at least one database layer 225, among others. The system 200 may also include at least one gateway 230 on the proxy layer 220 between the application layer 215 and the database layer 225. The gateway 230 may include at least one request filter 235, at least one token validator 240, and at least one access controller 245, among others. The system 200 may include at least one request authenticator 250 on the application layer 215 of the database system 205. The system 200 may include a set of compartments 255A-N (hereinafter generally referred to as compartments 255) on the database layer 225 of the database system 205.

Embodiments may comprise additional or alternative components or omit certain components from those of FIG. 2 and still fall within the scope of this disclosure. Various hardware and software components of one or more public or private networks may interconnect the various components of the system 200. Each component in system 200 may be any computing device comprising of one or more processors coupled with memory and software and capable of performing the various processes and tasks described herein.

Within the database system 205, the application layer 215 may administer or manage interfacing with the client 210 in accessing data through the database system 205. The application layer 215 may include one or more applications, services, or interfaces handling communications from the client 210 at the database system 205 in accessing data. The request authenticator 250 may also handle initial authentication checks for communications originating from the client 210. The one or more applications, services, or interfaces may also handle communications from the other layers (e.g., the proxy layer 220) in the database system 205 destined to the client 210. For example, an application on the application layer 215 may be a web application provided to the client 210 to facilitate interactions by the user with the functionalities of the database system 205, such as reading and writing data onto the compartments 255. The application layer 215 may provide resources (e.g., hardware or virtual resources) in facilitating the execution of the applications, services, or interfaces with the client 210.

The proxy layer 220 may be an intermediary (e.g., logically or hierarchically) between the application layer 215 and the database layer 225. Communications from the application layer 215 may first arrive at the proxy layer 220 prior to routing to the database layer 225. Conversely, communications from/to the database layer 225 destined to the application layer 215 (or the client 210) may first reach the proxy layer 220. The gateway 230 on the proxy layer 220 may facilitate or manage communications from the application layer 215 to the database layer 225, and communications from the database layer 225 to the application layer 215. For example, the gateway 230 may manage traffic management, such as caching, throttling, and load balancing of requests passing through the application layer 215 across the database layer 225. Other functionalities of the gateway 230 on the proxy layer 220 are detailed herein.

The database layer 225 (sometimes referred herein as a data layer) may manage and administer the storage and maintenance of the data across the set of compartments 255 (sometimes referred herein as databases). The data stored in the compartments 255 may be related to the applications or services provided by the application layer 215. For instance, for a digital bank application, the data may include account identifiers, bank routing numbers, remaining balance, and other account-related information. The database layer 225 may allocate, supply, or otherwise provide resources (e.g., physical or virtual disk space) in storing and maintaining the data across the set of compartments 255. Each compartment 255 may be referenced or may correspond to a unique identifier. The unique identifier may be, for example, a set of alphanumeric characters or numerical value to reference the respective compartment 255. Each compartment 255 may include a set of data elements. The set of data elements may be arranged in accordance with a database schema. For example, the set of data elements may be arranged as a table with a set of rows and columns, and each data element may be a field-value pair. Each data element may identify or include the unique identifier referencing the compartment 255 and at least one identifier of the gateway 230 through which the element is accessible.

To access data on the database system 205, the client 210 may provide, transmit, or otherwise send a request 260 to the database system 205. The request 260 may be to access data in at least one of the set of compartments 255 on the database layer 225. The request 260 may include an identifier of the compartment 255 (or the data elements in the compartment 255) to be accessed by the client 210. The accessing may include, for example, reading, writing, editing, or creating data on the compartment 255. The request 260 may include a header and a payload, among others. For example, the header of the request 260 may include: an identifier corresponding to the client 210; and an identifier corresponding to the database system 205, the compartment 255, or the data element on the compartment 255 to be accessed, among others. The payload of the request 260 may include the data to be written onto the compartment 255.

In some embodiments, the request 260 may identify or include authentication credentials of the user of the client 210, such as an account identifier of the user and a passcode for the account. For example, the authentication credentials may be entered or inputted by the user using a graphical user interface provided by the web application on the application layer 215. Upon being authenticated, the client 210 may create, write, or otherwise generate the request 260 to send to the database system 205. The request 260 may initially lack any tokens granting access to the data on the compartments 255 on the database system 205.

The request authenticator 250 executing on the application layer 215 may retrieve, obtain, or otherwise receive the request 260 from the client 210. The request authenticator 250 may be part of the application with which the client 210 is interfacing or a separate service managing the initial authentication of the client 210 separate from the application. With receipt, the request authenticator 250 may execute, carry out, or otherwise perform initial authentication of the client 210 using the request 260. The request authenticator 250 may check whether the authentication credentials from the request 260 with the authentication credentials on the database system 205. When the authentication credentials do not match, the request authenticator 250 may identify or determine that the request 260 is not authenticated at the application layer 215. The request authenticator 250 may also return, transmit, or otherwise send an indication of the failure to authenticate to the client 210. When the authentication credentials match, the request authenticator 250 may identify or determine that the request 260 is successfully authenticated at the application layer 215. The request authenticator 250 may also enforce or apply access permissions at the application layer 215 based on the determination.

With the successful authentication, the request authenticator 250 may produce, create, or otherwise generate at least one token 265 based on an encryption of an identifier of the compartment 255 to be accessed by the client 210. The token 265 may grant the client 210 access to the data on the compartment 255 identified by the request 260, contingent on authorization at the proxy layer 220. In some embodiments, the request authenticator 250 may generate the token 265 based on the encryption of an identifier of the gateway 230 through which the client 210 is to access the data on the compartment 255. For instance, the identifier may be a combination of identifiers referencing the compartment 255 to be accessed and the gateway 230 through which the client 210 is to access the data. The encryption may be in accordance with any number of encryption algorithms, such as a hash-based message authentication code (HMAC), Rivest-Shamir-Adleman (RSA) algorithm, advanced encryption standard (AES), Diffie-Hellman key exchange protocol, or an elliptic curve cryptography, among others. For example, the request authenticator 250 may use a public encryption key provided by the gateway 230 to encrypt the identifier referencing the compartment 255. In some embodiments, the request authenticator 250 may communicate with a token issuance service to generate the token 265.

In addition, the request authenticator 250 may produce, create, or otherwise generate a context in which the client 210 is to access the data in the compartment 255. The context may identify or include one or more attributes of the data elements to be accessed by the client 210. The attributes may include, for example, the identifier of each data element to be accessed (e.g., a row and column identifier), the identifier of the client 210 (or the user), or the application on the application layer 215 through which the client 210 is accessing the data, among others. In addition, the attributes may also define or identify operations to be performed on the data element, such as read, write, create, or delete operations, among others. With the generation, the request authenticator 250 may insert, inject, or otherwise add the token 265 and the context to the request 260. In some embodiments, the request authenticator 250 may add the token 265 (or the context or both) to the header of the request 260. With the addition, the request authenticator 250 may also pass, forward, or otherwise send the request 260, including the token 265 and the context to the gateway 230 on the proxy layer 220.

The request filter 235 of the gateway 230 executing on the proxy layer 220 may retrieve, identify, or otherwise receive the request 260 from the client 210 via the application layer 215. The request 260 may include the context in which the client 210 is to access the compartment 255 and the token 265 of the encryption of the identifier of the compartment 255. With receipt at the gateway 230, the request filter 235 may extract or identify the token 265 and the context from the request 260. The request filter 235 may decrypt the token 265 to extract, recover, or identify the identifier of the compartment 255 (or of the gateway 230 or both). The decryption may be in accordance with the same encryption algorithm used to generate the token 265. For instance, the request filter 235 may use the private encryption key associated with the public encryption key used by the request authenticator 250 to decrypt the identifier of the compartment 255 from the token 265. The public encryption key may be communicated or shared between the application layer 215 and the gateway 230 on the proxy layer 220.

The token validator 240 of the gateway 230 executing on the proxy layer 220 may determine or identify whether the identifier decrypted from the token 265 corresponds to or references the compartment 255 to be accessed. The token validator 240 may select or identify the compartment 255 to be accessed from the context of the request 260. In some embodiments, the token validator 240 may retrieve, obtain, or otherwise identify the identifier for the compartment 255 from the data element to be accessed on the database layer 225. The token validator 240 may compare the identifier decrypted from the token 265 with the compartment 255 with the identifier of the compartment 255 from the database layer 225.

If the identifier decrypted from the token 265 does not correspond to the identifier of the compartment 255 to be accessed, the token validator 240 may identify that the identifier decrypted from the token 265 does not reference the compartment 255 on the database layer 225. The token validator 240 may identify or determine that the token 265 is invalid. On the other hand, if the identifier decrypted from the token 265 corresponds to the identifier of the compartment 255 to be accessed, the token validator 240 may identify that the identifier decrypted from the token 265 references the compartment 255 on the database layer 225. The token validator 240 may identify or determine that the token 265 is valid. In some embodiments, the token validator 240 may determine whether the identifier decrypted from the token 265 references the compartment 255 that is associated with the gateway 230. When the identifier decrypted from the token 265 references the compartment 255 associated with the gateway 230, the token validator 240 may perform the identification as detailed above. Otherwise, when the identifier decrypted from the token 265 references the compartment 255 not associated with the gateway 230, the token validator 240 may communicate with an external service (e.g., another instance of the gateway 230) to determine whether the client 210 is authorized to access the data in the compartment 255. The external service may perform the authorization as detailed herein.

In some embodiments, the token validator 240 may determine or identify whether the identifier decrypted from the token 265 corresponds to or references the gateway 230 through which the client 210 is to access the compartment 255. As discussed herein, the identifier may reference the gateway 230 through which the client 210 is to access the data on the compartment 255, as well as reference the compartment 255 itself. The identification of whether the identifier corresponds to the gateway 230 may be in addition to whether the identifier corresponds to the compartment 255 to be accessed. To identify, the token validator 240 may compare the identifier decrypted from the token 265 with the identifier of the gateway 230 stored on the gateway 230. If the identifier decrypted from the token 265 does not correspond to the identifier of the gateway 230, the token validator 240 may determine that the identifier decrypted from the token 265 does not reference the identifier of the gateway 230. The token validator 240 may also identify or determine that the token 265 is invalid. On the other hand, if the identifier decrypted from the token 265 does not correspond to the identifier of the gateway 230, the token validator 240 may identify that the identifier decrypted from the token 265 does not reference the identifier of the gateway 230. The token validator 240 may also identify or determine that the token 265 is valid, when another identifier decrypted from the token 265 also corresponds to the identifier of the compartment 255 to be accessed.

The access controller 245 of the gateway 230 executing on the proxy layer 220 may identify or determine whether the client 210 is permitted, granted, or authorized to access the data in the compartment 255 through the proxy layer 220. When the identifier decrypted from the token 265 does not reference the compartment 255 on the database layer 225, the access controller 245 may determine that the client 210 is not authorized to access the data in the compartment 255 through the proxy layer 220. The access controller 245 may also output, create, or otherwise generate an indication that the client 210 is not authorized to access the data in the compartment 255 through the proxy layer 220. With the generation, the access controller 245 may return, transmit, or otherwise send the indication to the client 210 via the application layer 215. Conversely, when the identifier decrypted from the token 265 references the compartment 255 on the database layer 225, the access controller 245 may determine that the client 210 is authorized to access the data in the compartment 255 through the proxy layer 220.

When the client 210 is determined to be authorized to access the data in the compartment 255, the access controller 245 may identify or select at least one of a set of access permissions based on the context. The context may define one or more attributes on the accessing of the data on the compartment 255 by the client 210, such as a write operation, a read operation, a create operation, or a delete operation, among others. The operations to be performed as defined by the attributes may be used to select the access permissions for the client 210. The selection of the access permissions by the access controller 245 on the gateway 230 may be independent of any access permission granted at the application layer 215 upon successful authentication of the request 260. The set of access permissions may be defined, enforced, or otherwise applied by the proxy layer 220 to control access to the database layer 225. The set of access permissions may, for example, include a write permission to edit or write onto the data elements of the compartment 255; a create permission to create new data elements onto the compartment 255; a read permission to retrieve or access data elements from the compartment 255; a deletion permission to erase or remove data elements on the compartment 255, among others. The selection may be based on the context specified by the request 260. For instance, when the context specifies that the client 210 is performing a read operation on the data elements without any indication of writing, creating, or deleting operations, the access controller 245 may identify the read permission for the client 210.

In some embodiments, the access controller 245 may identify or select the access permission from the set based on the data element in which the data is to be accessed from the compartment 255 by the client 210. The access controller 245 may access the compartment 255 to retrieve, find, or otherwise identify the access permission specified by the data element to be accessed by the client 210. Each data element on the compartment 255 may define or specify the access permission. For instance, the access controller 245 may access the compartment 255 to check the access permission defined by each data element to be accessed. Based on the definitions of the data elements on the compartment 255 to be accessed, the access controller 245 may select the access permission for each data element.

The access controller 245 may output, produce, or otherwise generate an indication 270 that the client 210 is authorized to access the data in the compartment 255 on the database layer 225 through the proxy layer 220 in accordance with the access permission. The indication 270 may identify or include the access permission for each data element to be accessed by the client 210. In some embodiments, the access controller 245 may output, produce, or otherwise generate at least one token 265'. The generation of the token 265' may be in response to determining that the client 210 is authorized to access the data on the compartment 255. The token 265' may be a derivative of the token 265 added to the request 260 at the application layer 215. The token 265' may identify or include one or more of the context, an encryption of the identifier of the compartment 255 to be accessed, and an identifier of the client 210, among others. The encryption may be in accordance with any encryption algorithm, such as the same encryption algorithm used to generate the token 265.

With the generation of the indication 270, the access controller 245 may transmit, provide, or otherwise send the indication 270 as a response to indicate that the client 210 is authorized to access the data in the compartment 255 through the proxy layer 220. The indication 270 may identify or include the token 265' generated at the proxy layer 220 to grant the client 210 access to the data in the compartment 255 on the database layer 255. The indication 270 may be sent to the client 210 via the application layer 215. For example, the request authenticator 250 or the related application may forward the response, including the token 265' to the client 210. The client 210 may retrieve, identify, or otherwise receive the indication 270 that the client 210 is authorized to access the data on the compartment 255. Using the token 265', the client 210 may access the data elements on the compartment 255 through the proxy layer 220 as identified in the indication 270.

Figure 3:
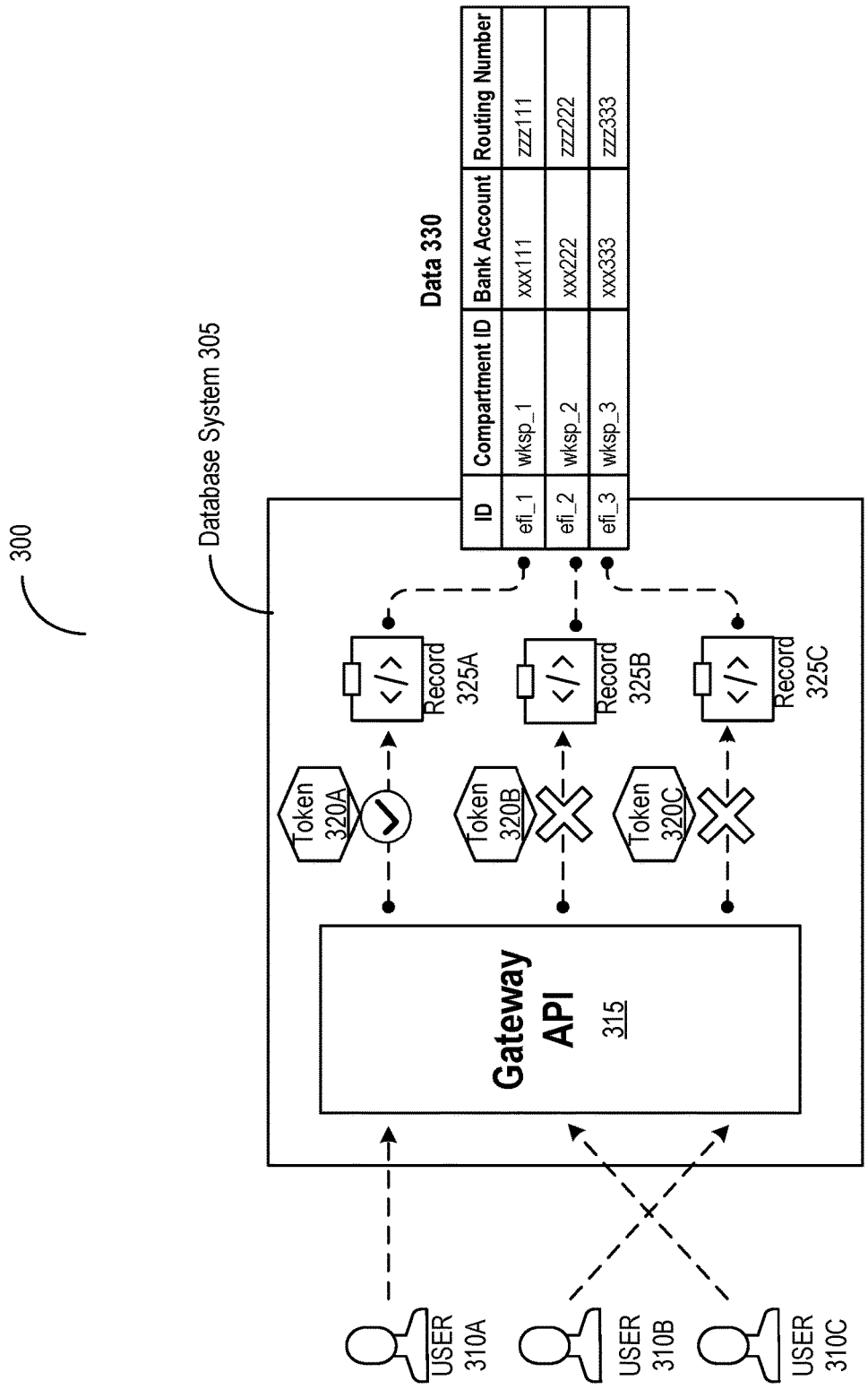
FIG. 3 illustrates a block diagram of an environment for authenticating clients to access data in components via an application programming interface (API) gateway, in accordance with an embodiment.

FIG. 3 illustrates a block diagram of an environment 300 for authenticating clients to access data in components via a gateway application programming interface (API). The system or environment 300 may include at least one database system 305 maintaining data 330 to be accessed by one or more users 310A-C. The database system 305 may include at least one gateway API 315 on a proxy layer between the users 310A-C and a database layer. As depicted, the gateway API 315 may receive requests from the users 310A-C. The request from the user 310A may include a token 320A with the identifier matching the compartment identifier. In contrast, the requests from the users 310A and 310B may include tokens 320B and 320C, respectively, with the identifier not matching the compartment identifier. Since the token 320A has the identifier matching the compartment identifier, the gateway API 315 may grant access to a record 325A in the compartment containing the data 330. Conversely, because the tokens 320B and 320C have identifiers that do not match the respective compartment identifiers, the gateway API 315 may deny access to the corresponding records 325B and 325C on the compartments.

Figure 4A:
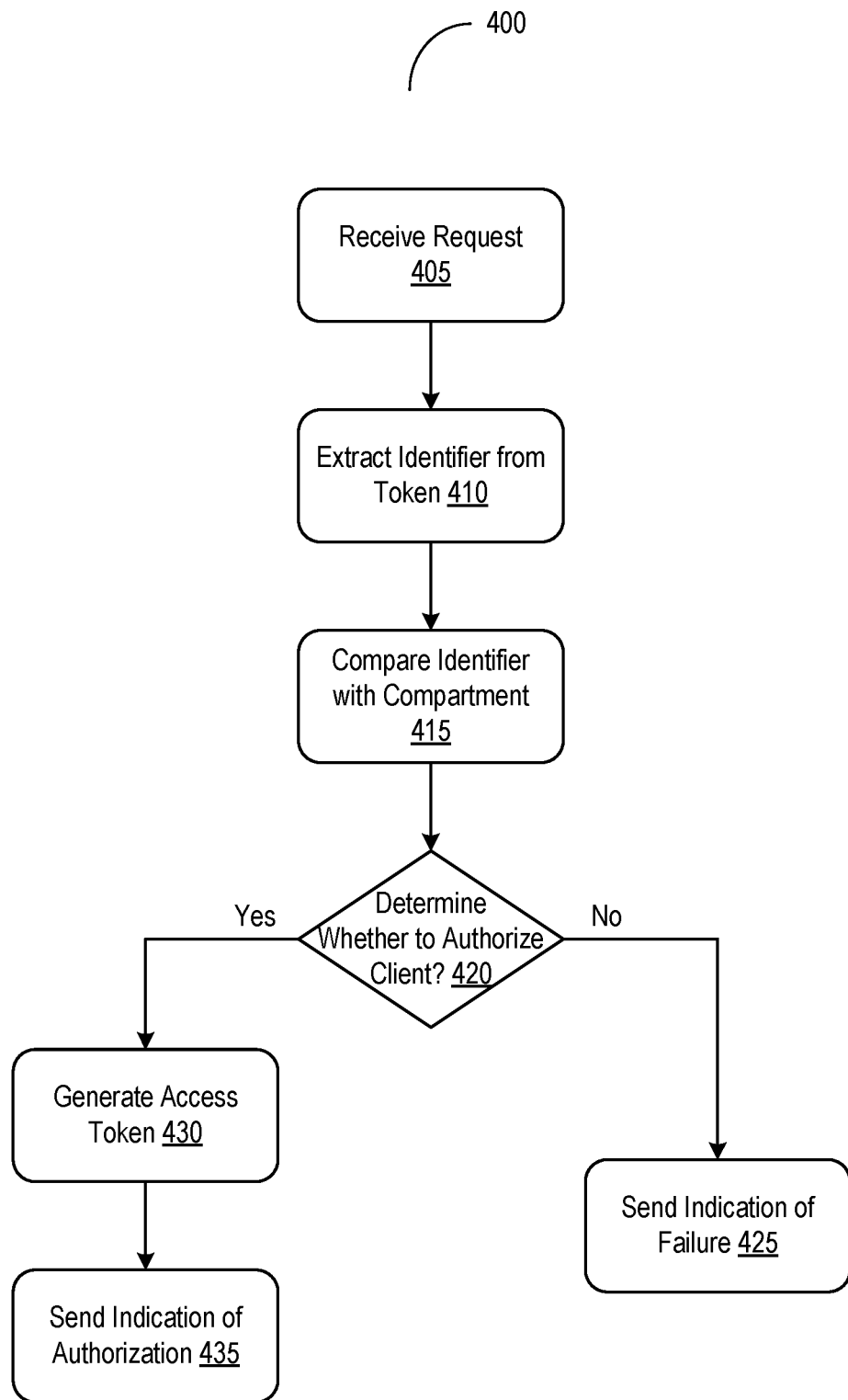
FIG. 4A illustrates a flow diagram of a method of authenticating clients to access data via proxy layers, in accordance with an embodiment.

FIG. 4A illustrates a flow diagram of a method 400 of authenticating clients to access data via proxy layers. Embodiments may include additional, fewer, or different operations from those described in the method 400. The method 400 may be performed by a server executing machine-readable software code, though it should be appreciated that the various operations may be performed by one or more computing devices and/or processors. At step 405, a gateway on a proxy layer may receive a request from a client to access data in a compartment on a database layer. The request may be passed via an application layer to the proxy layer. The request may include a context in which the client is to access the compartment. The request may also include a token generated based at least on encryption of an identifier of the compartment upon successful authentication of the request at the application layer.

At step 410, the gateway may extract the identifier of the token of the request. To extract, the gateway may decrypt the token using an encryption key associated with the encryption of the identifier. For example, the gateway may decrypt the token using a private key that is associated with a public key used to encrypt the identifier at the application layer. The gateway may also identify the context from the request. At step 415, the gateway compares the identifier extracted from the token with the identifier of the compartment to be accessed. The gateway may identify the compartment to be accessed using the attributes of the context. The gateway may retrieve the identifier for the compartment from the database layer.

At step 420, the gateway may determine whether the client is authorized based on the comparison. If the identifier extracted from the token references the compartment to be accessed, the gateway may determine that the client is authorized to access the data on the compartment. On the other hand, if the identifier extracted from the token does not reference the compartment to be accessed, the gateway may determine that the client is not authorized to access the data on the compartment. At step 425, when the client is not authorized to access the data on the compartment, the gateway may send an indication of failure to authorize.

At step 430, when the client is not authorized to access the data on the compartment, the gateway may generate an access token. The token may include the context, the encryption of the identifier of the compartment, and an identifier of the client. The gateway may also select one or more access permissions defining the accessing of the data on the compartment by the client. At step 435, the gateway may send an indication of authorization. The indication may identify that the client is authorized to access the data on the compartment. The indication may also identify the one or more access permissions for the client. With receipt, the client may use the access token to access the compartment on the database layer through the proxy layer. The gateway may apply the access permissions specified by the access token, as the client accesses the data stored on the compartment in the database layer.

Figure 4B:
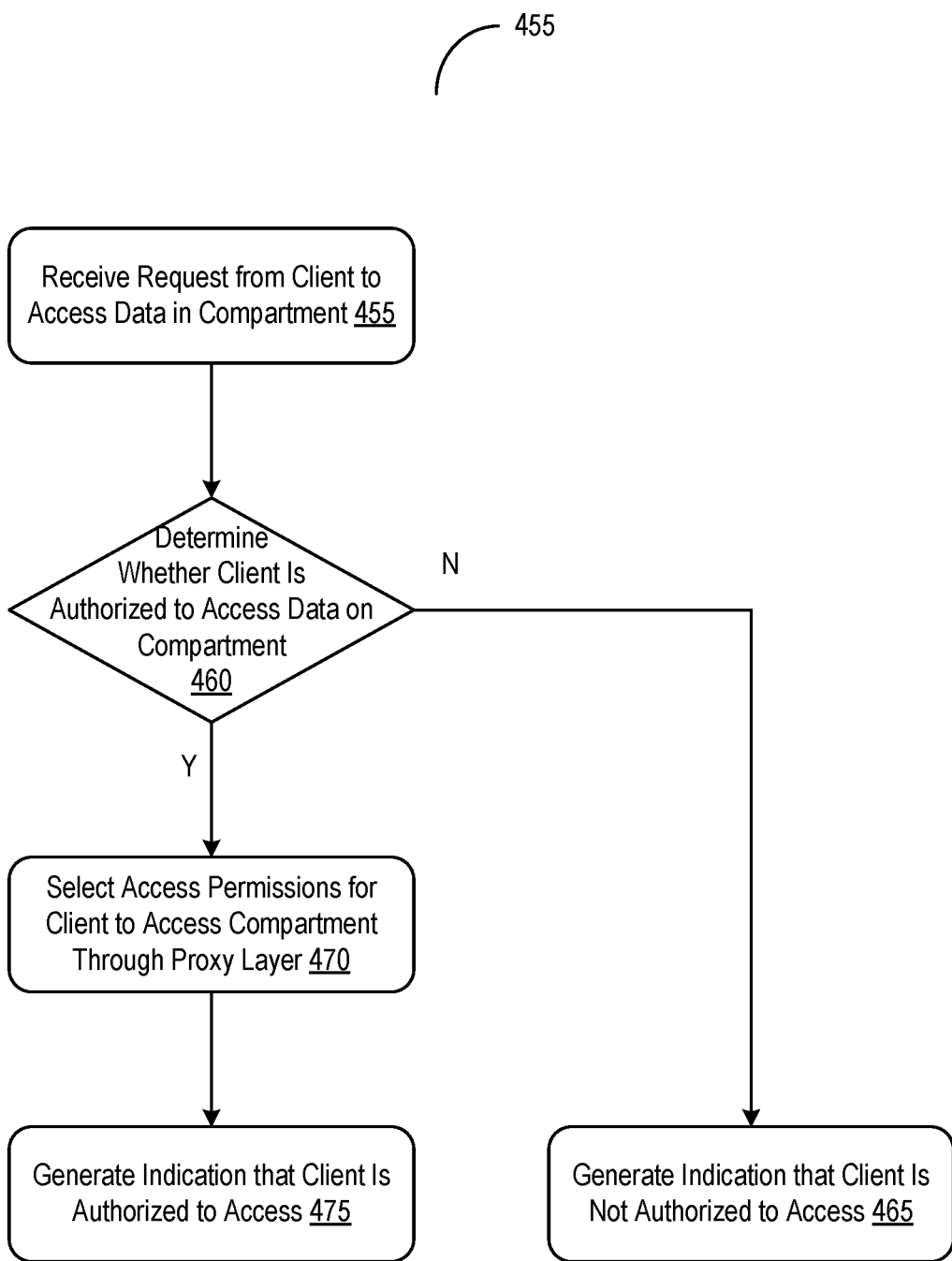
FIG. 4B illustrates a flow diagram of a method of authenticating clients to access data via proxy layers, in accordance with an embodiment.

FIG. 4B illustrates a flow diagram of a method 450 of authenticating clients to access to data via one or more proxy layers. Embodiments may include additional, fewer, or different operations from those described in the method 450. The method 450 may be performed by a server executing machine-readable software code, though it should be appreciated that the various operations may be performed by one or more computing devices and/or processors. At step 455, a gateway on a proxy layer between an application layer and a database layer may receive a request from a client to access data in a compartment of a plurality of compartments on the database layer. The request may include (i) a context in which the client is to access the compartment and (ii) a token generated based at least on an encryption of an identifier of the compartment responsive to successful authentication of the request at the application layer.

The context may include one or more attributes, such as the identifier of each data element to be accessed, the identifier of the client, and an identification of the operations to be performed on the data element, among others. Each compartment of the plurality of compartments may include a plurality of elements. An element, as used herein, may include a unit of data stored and maintained in the compartment. For example, the set of data elements may be arranged as a table with a set of rows and columns, and each data element may be a field-value pair.

Each element of the plurality of elements may include at least one of (i) the identifier of the compartment to which the element belongs and (ii) an identifier of the gateway through which the element is to be accessed. In some embodiments, the token may also have been added to a header of the request responsive to the authentication of the request at the application layer. In some embodiments, the token may be issued by a first service to access the plurality of compartments and may be configured to have an expiration deadline extendable by a second service, by using a shared key between the first service and the second service.

At step 460, the gateway may determine whether the client is authorized to access the data in the compartment on the database layer through the proxy layer. The determination may be based on an identification of whether the identifier decrypted from the token of the request as referencing the compartment of the plurality of compartments. The gateway may extract the identifier from the token of the request by decrypting the identifier of the compartment using an encryption key shared between the application layer and the gateway layer. Responsive to identifying the identifier decrypted from the token of the request as referencing the compartment of the plurality of compartments, the gateway may determine that the client is authorized to access the data in the compartment on the database layer through the proxy layer.

Conversely, responsive to identifying the identifier decrypted from the token of the request as not referencing the compartment of the plurality of compartments, the gateway may determine that the client is not authorized to access the data in the compartment on the database layer through the proxy layer. At step 465, the gateway may generate an indication that the client is not authorized to access the data in the compartment on the database layer responsive to determining that the client is not authorized to access the data in the compartment on the database layer through the proxy layer.

At step 470, the gateway may select, from a plurality of access permissions defined by the proxy layer to control access to the database layer, at least one access permission for the client to access the compartment through the proxy layer based on the context of the request. The plurality of access permissions may include, for example, a write permission to edit or write onto the data elements of the compartment; a create permission to create new data elements onto the compartment; a read permission to retrieve or access data elements from the compartment; a deletion permission to erase or remove data elements on the compartment, among others. In some embodiments, the gateway may identify the at least one access permission, independent of any access permission granted at the application layer responsive to successful authentication of the request at the application layer.

At step 475, the gateway may generate an indication that the client is authorized to access the data in the compartment on the database layer through the proxy layer in accordance with the at least one access permission, to provide the client with the via the application layer. In some embodiments, the gateway may generate a second token to include (i) the context, (ii) an encryption of the identifier of the compartment, and (iii) an identifier of the client, responsive to determining that the client is authorized to access the data. In embodiments, the gateway may send a response, including the second token, to grant the client access to the data in the compartment on the database layer.

In this manner, the gateway on the proxy layer may control access to data on compartments on the database layer to file access requests passing through the application layer. When a request from a client is authenticated at the application layer, a token (also herein referred to as secure context) may be added in the request to identify which compartment on the database layer to access. The token may include an encrypted identifier of the compartment to be accessed by the client. Upon receipt at the proxy layer, the gateway may extract the token from the request and may decrypt the encrypted identifier using an encryption key shared between the proxy layer.

With the extraction of the token, the gateway may determine whether the identifier in the token matches an identifier of the compartment. If the decrypted identifier does not match the identifier of the compartment, the gateway may refuse the client access to the client. On the other hand, if the decrypted identifier matches the identifier of the compartment, the gateway may determine to grant the client access to the client. When the client is to be granted access, the gateway may generate another token to send to the client to indicate authorization to access the database. Having the gateway perform this additional check may provide the advantage of providing multiple layers of control between the client and the compartment. In addition, the token may be on a per compartment or resource basis rather than a user or device basis, providing more granular control over which data the client is able to access, thereby improving data security.

Figure 5A:
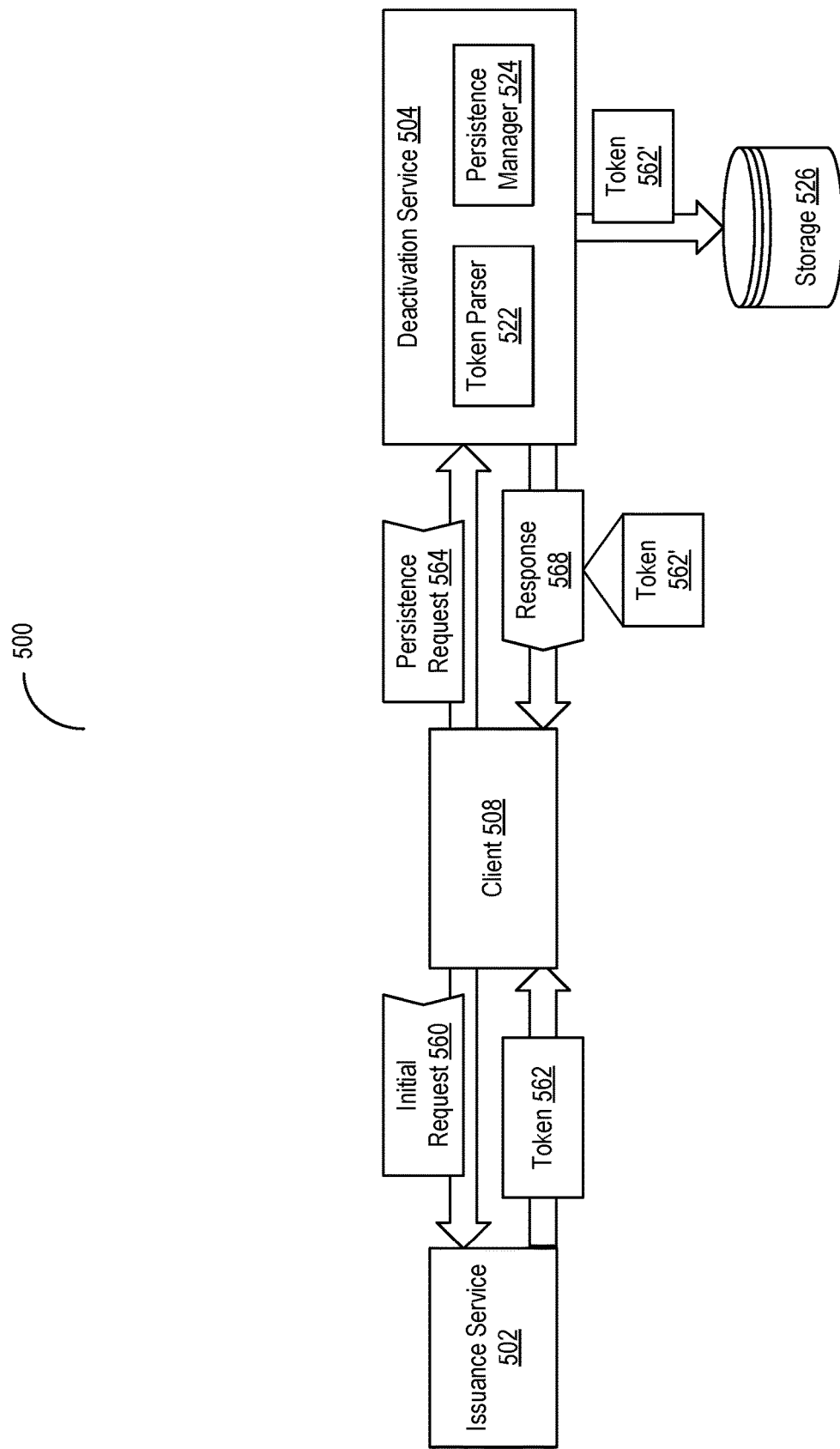
FIGS. 5A and 5B illustrate block diagrams of a system for generating tokens to grant clients access to data, in accordance with an embodiment.
Figure 5B:
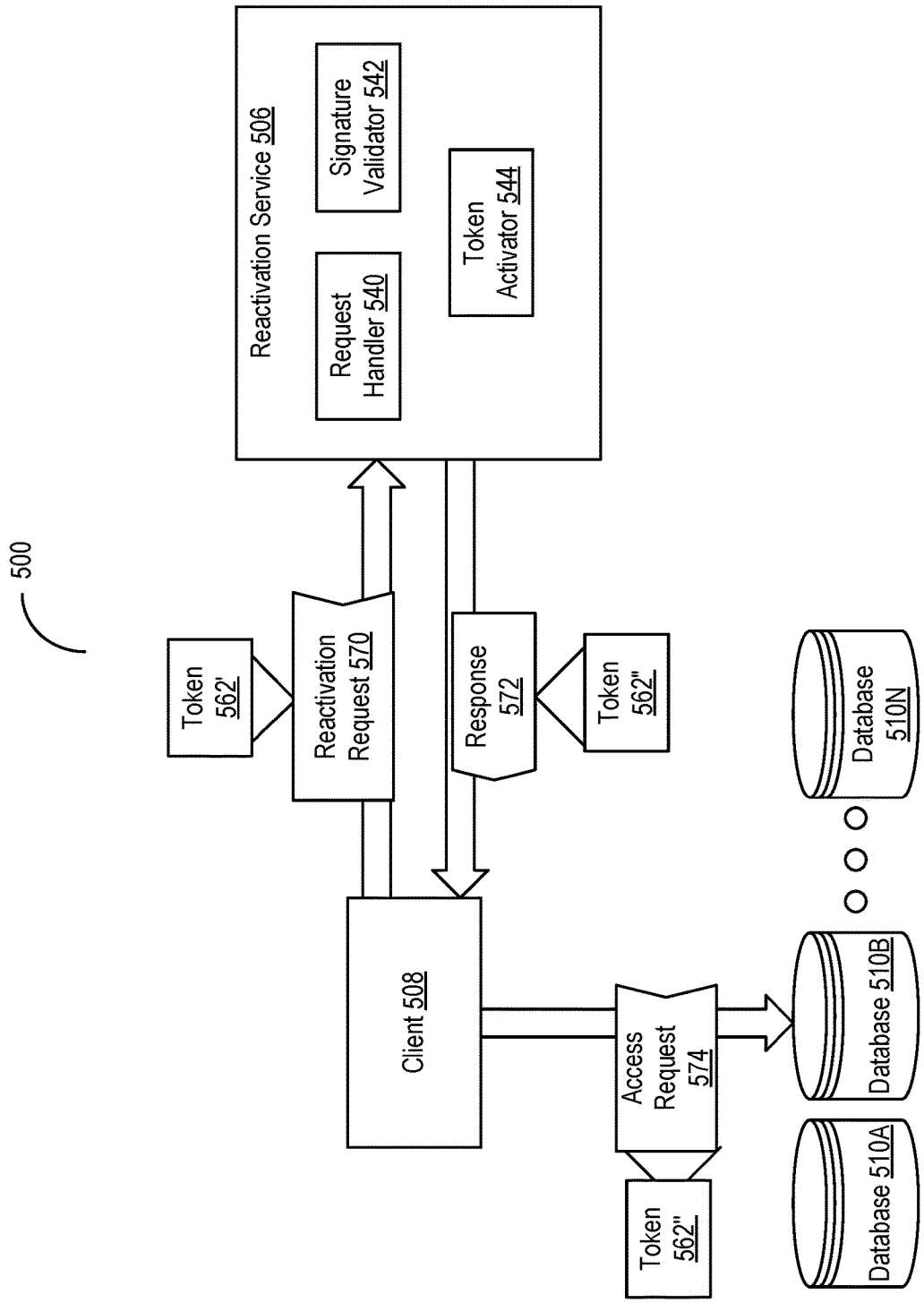

FIGS. 5A and 5B illustrate block diagrams of a system 500 for generating tokens to grant clients access to data. In overview, the system 500 may include at least one issuance service 502, at least one deactivation service 504, at least one reactivation service 506, at least one client 508, and a set of databases 510A-N (hereinafter generally referred to as databases 510), among others. The deactivation service 504 may include at least one token parser 522, at least one persistence manager 524, and at least one storage 526, among others. The reactivation service 506 may include at least one request handler 540, at least one signature validator 542, and at least one token activator 544, among others. In some embodiments, the issuance service 502, the deactivation service 504, and the reactivation service 506 may each be instances of another, and each may include the functionalities ascribed to the other. For example, the deactivation service 504 may include the functionalities of the reactivation service 506 and vice-versa.

Embodiments may comprise additional or alternative components or omit certain components from those of FIGS. 5A and 5B and still fall within the scope of this disclosure. Various hardware and software components of one or more public or private networks may interconnect the various components of the system 500. Each component in system 500 may be any computing device comprising of one or more processors coupled with memory and software and capable of performing the various processes and tasks described herein.

The client 508 may provide, transmit, or otherwise send an initial request 560 to the issuance service 502. The initial request 560 may be to grant the client 508 access to data on one or more of the databases 510, and to issue a token to access data on the databases 510. The initial request 560 may identify or include a context in which the client 508 is to access the data in at least one of the databases 510. The context may identify or include one or more attributes of the data element to be accessed by the client 508. The attributes may identify or include, for example, the data to be accessed (e.g., a row and column identifier), identifiers of the one or more databases 510 to be accessed, and the identifier of the client 508 (or the user), among others. In some embodiments, the initial request 560 may include authentication credentials of the user of the client 508, such as an account identifier of the user and a passcode for the account.

The databases 510 may be part of one or more database systems. The data on the databases 510 may be associated with the applications or services accessed by the client 508. The database system may allocate, supply, or otherwise provide resources (e.g., physical or virtual disk space) in storing and maintaining the data across the set of databases 510. Each database 510 may include a set of data elements. The set of data elements may be arranged in accordance with a database schema. For example, the set of data elements may be arranged as a table with a set of rows and columns, and each data element may be a field-value pair. In some embodiments, each database 510 may correspond to a respective compartment of a set of compartments on a database layer of the database system.

The issuance service 502 may retrieve, identify, or otherwise receive the initial request 560 from the client 508. In some embodiments, the issuance service 502 may receive the initial request 560 indirectly from the client 508 via another service (e.g., a gateway on a proxy layer of the database system). With receipt, the issuance service 502 may extract or identify the context from the initial request 560. Using the context, the issuance service 502 may identify or select the one or more databases 510 to be accessed by the client 508. For each database 510, the issuance service 502 may retrieve or obtain the identifier referencing the database 510. The identifier of the database 510 may be a set of alphanumeric characters or numerical value to reference the respective database 510.

In some embodiments, the issuance service 502 may execute, carry out, or otherwise perform initial authentication of the client 508 using the initial request 560. In some embodiments, the issuance service may include a request handler 540. The request handler 540 may check whether the authentication credentials from the initial request 560 matches or corresponds to the authentication credentials on the issuance service 502 (or the database system or another service). When the authentication credentials do not match, the issuance service 502 may identify or determine that the initial request 560 is not authenticated. The issuance service 502 may also return, transmit, or otherwise send an indication of the failure to authenticate to the client 508. When the authentication credentials match, the issuance service 502 may identify or determine that the initial request 560 is successfully authenticated and may continue with the process.

The issuance service 502 may create, produce, or otherwise generate at least one token 562 for the client 210 using the context of the initial request 560. The generation of the token 562 may be in response to successfully authenticating the initial request 560 from the client 508. The token 562 may be generated in accordance with an authorization or authentication protocol, such as the Open Authorization (OAuth 2.0) protocol (e.g., for implicit grant, credentials grant, or authorization code grant), JavaScript Object Notation (JSON) web token, or a security assertion markup language (SAML), among others. The token 562 may serve to permit, authorize, or otherwise grant the client 508 to access the data on the one or more databases 510. In some embodiments, the token 562 may be used by the client 508 to access the data on the set of databases 510 (or compartments) on the database layer via a proxy layer of the database system.

The token 562 may identify or include at least one first signature generated using a symmetric encryption key. The symmetric encryption key may be in accordance with any number of symmetric encryption algorithms, such as an advanced encryption standard (AES), a Blowfish key, Rivest cipher, Skipjack, and message authentication code (HMAC), among others. For example, the issuance service 502 may generate the first signature using a nonce derived from the initial request 560, such as the context, the identifier of the client 508, or the identifier of the databases 510 to be accessed, among others. The token 562 may identify or include at least a one-second signature generated using an asymmetric encryption key. The asymmetric encryption key may be in accordance with any number of asymmetric encryption algorithms, such as the Rivest-Shamir-Adleman (RSA) algorithm, Diffie-Hellman key exchange protocol, or an elliptic curve cryptography, among others. For example, the issuance service 502 may generate a pair of encryption keys in accordance with the symmetric encryption algorithm. The pair of encryption keys may include a private encryption key kept and stored on the issuance service 502 and a public encryption key provided to the trusted services (e.g., the deactivation service 504 and the reactivation service 506). Using the private encryption key, the issuance service 502 may generate a second signature using a nonce derived from the initial request 560, such as the context, the identifier of the client 508, or the identifier of the databases 510 to be accessed, among others. The second signature of the token 562 may be used to authenticate the token 562 across multiple services, as the public encryption key may be shared with external entities (e.g., besides the issuance service 502).

In addition, the token 562 may include a set of identifiers corresponding to the set of databases 510 to be accessed to the client 508. For the identifiers, the issuance service 502 may use the context of the initial request 560 to obtain or generate the identifier for each database 510 to be accessed by the client 508. The set of identifiers of the token 562 may identify the corresponding set of databases 510 accessible to the client 508. The token 562 may identify or include an issuance time, an expiration time, and a threshold time (sometimes herein referred to as a lifetime), among others. The issuance time may identify or correspond to a time at which the token 562 is generated. The expiration time may identify, specify, or otherwise define a length of time during which the databases 510 are accessible to the client 508 using the token 562. The expiration time may, for example, range from 1 minute to 24 hours relative to the generation and issuance of the token 562 to the client 508. The threshold time limit may identify, specify, or otherwise define a length of time after which the token 562 is not extendable or cannot be reactivated. The length of time for the threshold time limit may be greater than the length of time for the expiration time. The threshold time limit may, for example, range from 10 minutes to 1 month. The expiration time period and the threshold time limit may be predefined by the administrator of the databases 510 or the issuance service 502.

With the generation of token 562, the issuance service 502 may provide, transmit, or otherwise send the token 562 to the client 508. In some embodiments, the issuance service 502 may pass, transmit, or otherwise send the token 562 to the deactivation service 504. Upon receipt, the client 508 may use the token 562 to access any one or more of the databases 510. Subsequently, the client 508 may provide, transmit, or otherwise send a persistence request 564 to deactivate the token 562. The persistence request 564 may identify or include the token 562 generated by the issuance service 502. The persistence request 564 may be to deactivate (or de-hydrate) the token 562 to temporarily (e.g., for a period of time or until reactivation) disable access to the databases 510 to the client 508. In some embodiments, the persistence request 564 may be to provide asynchronous access to the databases 510 for the client 508, independent of the issuance service 502.

The token parser 522 executing on the deactivation service 504 may retrieve, identify, or otherwise receive the persistence request 564 from the client 508. From the persistence request 564, the token parser 522 may extract or identify the token 562 and other data (e.g., the context). The token 562 may include the first signature generated using the symmetric encryption key and the second signature generated using the asymmetric encryption key, among others. As discussed above, the second signature of the token 562 may be used to authenticate the token 562 across multiple services for use in accessing the set of databases 510 using a public encryption key that is paired with a private encryption key used to generate the second signature. The context may define, specify, or otherwise identify one or more attributes for accessing of the data elements on the databases 510 for the client 508, such as the identification of each database 510, the identification of each data element on the database 510, and the operation operations to be performed on the data, among others. In some embodiments, the context may be a part of the token 562 or may be separate from the token 562 and included in the persistence request 564. The token 562 may also include the issuance time, expiration time, and the threshold time limit, among others.

From the token 562, the token parser 522 may select or identify the second signature as generated using the asymmetric encryption key (or an asymmetric encryption algorithm). To identify, the token parser 522 may examine or inspect the token 562 to identify the field corresponding to a type of signature as the second signature. With the identification, the token parser 522 may obtain, retrieve, or otherwise identify the value corresponding to the second signature itself. In addition, using the context, the token parser 522 may identify or determine the set of databases 510 that is accessible to the client 508 using the token 562. In some embodiments, the token parser 522 may generate or determine the set of identifiers corresponding to the set of databases 510 from the one or more attributes of the context in which the client 508 is to access the data on the set of databases 510.

The persistence manager 524 executing on the deactivation service 504 may write, create, or otherwise generate a token 562' (sometimes herein referred to as a deactivated, offline, or persistent token) derivative of the token 562. The generation of the token 562' may be generated in accordance with an authorization or authentication protocol, such as the same protocol as the token 565. In generating, the persistence manager 524 may generate the token 562' to include the first signature generated using the symmetric encryption key from the token 562, and the set of identifiers corresponding to the set of databases 510 accessible to the client 508 using the token 562'. In some embodiments, the persistence manager 524 may also generate the token 562' to include the context, including the one or more attributes defining the access of the set of databases 510 for the client 508. The token 562' may also identify or include the expiration time and the threshold time limit, among others.

The persistence manager 524 may delete, erase, or otherwise remove the second signature identified as generated using the asymmetric encryption key. The removal of the signature may be referred herein as a defanging procedure. To remove, the persistence manager 524 may delete or exclude the second encryption key from the token 562 to derive or generate the token 562'. In some embodiments, the persistence manager 524 may change, alter, or otherwise modify the second encryption key by applying the public encryption key shared by the issuance service 502. With the modification, the persistence manager 524 may maintain the modified second encryption key in the token 562'.

In addition, the persistence manager 524 may generate a third signature using at least a portion of the original token 562 in accordance with an encryption key shared with the reactivation service 506. The portion (sometimes herein referred to as a secure request context envelope) of the original token 562 used to generate the third signature may include the first signature, the second signature, or the context, among others. The encryption key may be in accordance with any number of symmetric encryption algorithms relying on a shared secret (e.g., the encryption key), such as an advanced encryption standard (AES), a Blowfish key, Rivest cipher, Skipjack, and message authentication code (HMAC), among others. In conjunction, the persistence manager 524 may provide, transmit, or otherwise send the encryption key used to generate the third signature with one or more trusted services (e.g., the reactivation service 506).

With the generation of the token 562', the persistence manager 524 may store and maintain the token 562' on the storage 526. The storage 526 may be accessible to the reactivation service 506, the client 508, or the set of databases 510 (or the database system managing the databases 510), among others. For example, subsequent to storage, the client 508 may access the storage 526 to obtain or retrieve the token 562. In some embodiments, the persistence manager 524 may provide, transmit, or otherwise send at least one response 568, including the token 562' to the client 508. The client 508 may retrieve, identify, or otherwise receive the token 562' from the deactivation service 504. Because the token 562' may lack the second signature generated using the asymmetric encryption key, the use of the token 562' by the client 508 to access the set of databases 510 may be limited.

To make use of the token 562', the client 508 may provide, transmit, or otherwise send a reactivation request 570 to the reactivation service 506. The reactivation request 570 may reactivate (or re-hydrate) the token 562' for the client 508 to use to access the databases 510, beyond the original expiration time. The reactivation request 570 may identify or include the token 562' generated and provided by the deactivation service 504. In some embodiments, the client 508 may send the reactivation request 570, asynchronously to communication with the set of databases 510 (or the database management system for the databases 510).

The request handler 540 executing on the reactivation service 506 may retrieve, identify, or otherwise receive the reactivation request 570 from the client 508. With receipt, the request handler 540 may extract or identify the token 562' from the reactivation request 570. The token 562' may be to grant access the set of databases 510 prior to the expiration time as specified by the token 562'. The request handler 540 may process or parse the token 562' to extract or identify the contents of the token 562'. The token 562' may identify or include: the first signature generated by the issuance service 502 using the symmetric encryption key; the third signature generated by the deactivation service 504 using the shared encryption key; and the set of identifiers corresponding to the databases 510 accessible by the client 508 using the token 562', among others. The token 562' may also identify or include the issuance time, expiration time, and the threshold time limit.

The request handler 540 may identify or determine whether a time elapsed since the issuance is within the threshold time limit for reactivation of the token 562'. The request handler 540 may calculate or determine the time elapsed since issuance based on the issuance time identified in the token 562'. In conjunction, the request handler 540 may extract or identify the threshold time limit from the token 562' itself. With the identifications, the request handler 540 may compare the elapsed time with the threshold time limit. When the elapsed time does not exceed the threshold time limit, the request handler 540 may determine that the elapsed time is within the threshold time limit. The request handler 540 may also determine to continue with the reactivation of the token 562'. On the other hand, when the elapsed time exceeds the threshold time limit, the request handler 540 may determine that the elapsed time is outside the threshold time limit. The request handler 540 may also determine to terminate the reactivation of the token 562', and may send an indication of the termination to the client 508.

The signature validator 542 executing on the reactivation service 506 may determine or identify whether the decryption of the third signature is successful using the shared encryption key from the deactivation service 504. To decrypt, the signature validator 542 may apply the shared encryption key to the third signature in accordance with the symmetric encryption algorithm (e.g., HMAC) used by the deactivation service 504. With the application, the signature validator 542 may identify or determine whether the resultant of the decryption is well-formed (or has maintained integrity). If the resultant identifies the first signature, the second signature, and the context in a proper, expected format used to generate the third signature, the resultant of decryption may be identified as well-formed. For example, when the attributes of the context decrypted from the third signature correspond to the set of identifiers of the databases 510 also in the token 562', the signature validator 542 may determine that the resultant of the decryption as well-formed. When the resultant of the decryption is well-formed, the signature validator 542 may determine that the decryption is successful. The signature validator 542 may also identify the deactivation service 504 as associated with the shared key used to generate the third signature. Otherwise, when the resultant of the decryption is not well-formed, the signature validator 542 may determine that the decryption is not successful. The signature validator 542 may also identify the deactivation service 504 as not associated with the shared key used to generate the third signature.

Based on the identification of whether the decryption of the third signature is successful, the signature validator 542 may identify or determine whether the token 562' is valid. If the decryption of the third signature is successful, the signature validator 542 may determine that the token 562' is valid. In some embodiments, when the deactivation service 504 is identified as associated with the shared key used to generate the third signature, the signature validator 542 may determine that the token 562' is valid. The signature validator 542 may determine to continue with the reactivation of the token 562'. Conversely, if the decryption of the third signature is not successful, the signature validator 542 may determine that the token 562' is invalid. In some embodiments, when the deactivation service 504 is identified as not associated with the shared key used to generate the third signature, the signature validator 542 may determine that the token 562' is invalid. The signature validator 542 may determine to terminate the reactivation of the token 562', and may send an indication of the failure to validate the token 562' for continued access of the set of databases 510 to the client 508.

The token activator 544 executing on the reactivation service 506 may write, create, or otherwise generate a token 562" derivative of the token 562'. The generation of the token 562" may be in response to that the token 562' is valid based on the successful decryption of the third signature using the shared encryption key. In some embodiments, the generation of the token 562" may be in response to determining that the elapsed time is within the threshold time limit. The token activator 544 may insert or include the context from the token 562' into the token 562". The context may identify or include attributes defining the accessing of the set of databases 510 by the client 508. In some embodiments, the token activator 544 may include the set of identifiers corresponding to the set of databases 510 accessible to the client 508 using the token 562".

In generating the token 562", the token activator 544 may determine or generate a new fourth signature using an encryption key of the reactivation service 506. The encryption key may be in accordance with an asymmetric encryption algorithm (e.g., Rivest-Shamir-Adleman (RSA), elliptic curve cryptography, digital signature algorithm, or Diffie-Hellman key exchange protocol) or a symmetric encryption algorithm (e.g., an advanced encryption standard (AES), a Blowfish key, Rivest cipher, Skipjack, and message authentication code (HMAC)), among others. In addition, the token activator 544 may generate a fifth token using a symmetric encryption key. The symmetric encryption key may be the encryption key shared by the deactivation service 504, or generated by the reactivation service 506 and shared with the deactivation service 504. The symmetric encryption key may be in accordance with any number of symmetric encryption algorithms, such as an advanced encryption standard (AES), a Blowfish key, Rivest cipher, Skipjack, and message authentication code (HMAC), among others.

With the generation of the new signatures, the token activator 544 may add or insert the fourth signature and the fifth signature into the token 562". The insertion of the new signatures may be to replace the original signatures. In some embodiments, the token activator 544 may delete, erase, or remove the signatures originally from the token 562', such as the first signature, the second signature, and the third signature, among others. In addition, the token activator 544 may insert or include the issuance time, the expiration time, and the threshold time limit of the token 562' into the token 562".

The token activator 544 may provide, transmit, or otherwise send a response 572, including the token 562" to the client 508. The provision of the token 562" to the client 508 may enable, allow, or grant the client 508 access to the data on the set of databases 510 identified by the token 562" beyond the initial expiration time. The client 508 may retrieve, identify, or otherwise receive the response 572 from the reactivation service 506. Upon receipt, the client 508 may process or parse the response 572 to extract or identify the token 562". Using the token 562", the client 508 may access the data across one or more of the databases 510 identified by the token 562". The databases 510 may correspond to compartments on a database layer in the architecture of the database management system. To access, the client 508 may transmit, provide, or otherwise send an access request 574 including the token 562" to the database 510 (or the database management system). The database management system may check the token 562" of the access request 574 to authenticate the client 508 to access the data.

Figure 6A:
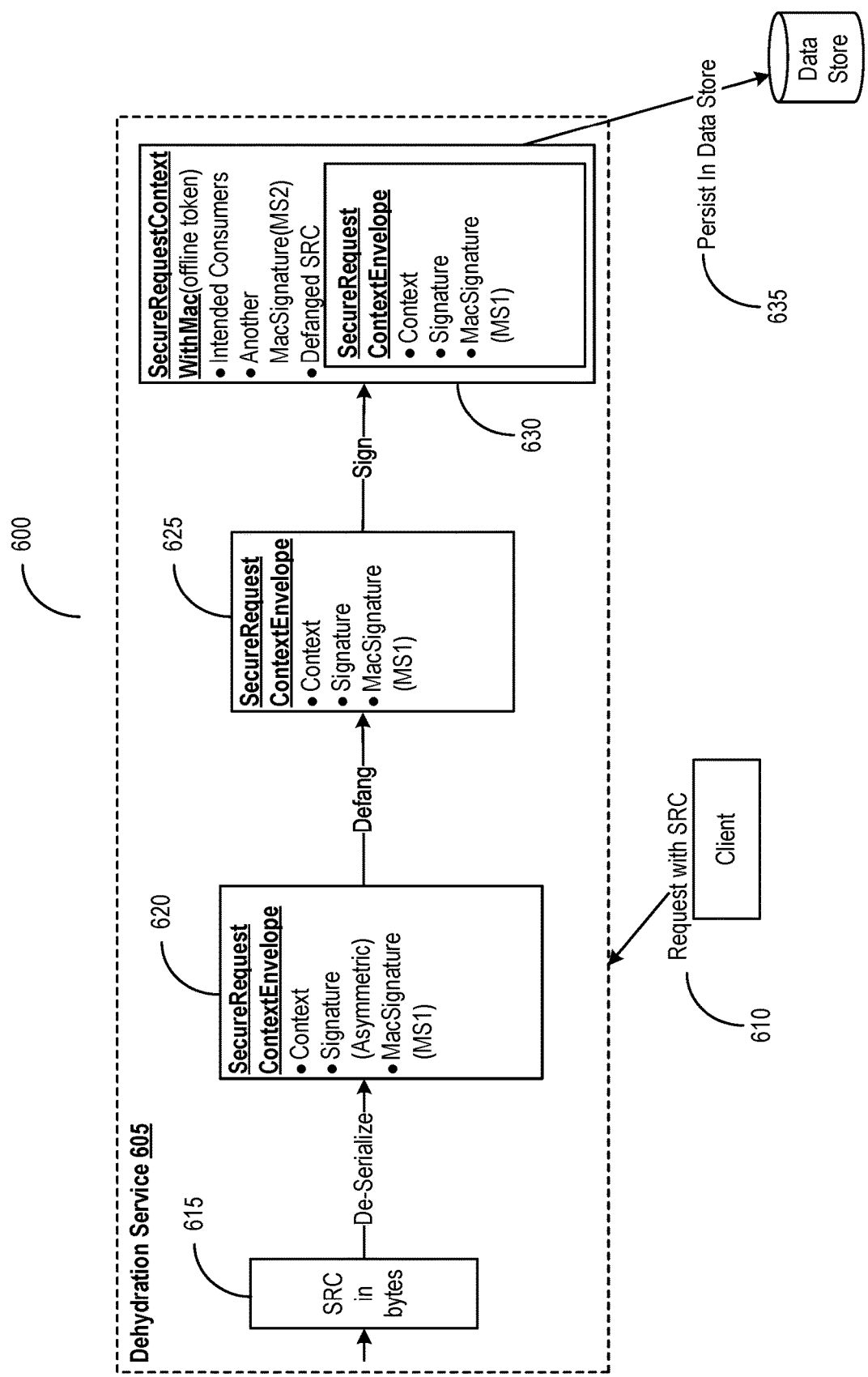
FIG. 6A illustrates a block diagram of a process for generating initial tokens to grant client access to data, in accordance with an embodiment.

FIG. 6A illustrates a block diagram of a process 600 for generating initial tokens to grant client access to data. Embodiments may include additional, fewer, or different operations from those described in the process 600. The process 600 may be performed by a server executing machine-readable software code, though it should be appreciated that the various operations may be performed by one or more computing devices and/or processors, such as a dehydration service 605. Under the process 600, at step 610, the dehydration service 605 may receive a secure request context (sometimes herein referred to as a token) from a client. At step 615, the dehydration service 605 may unpack a binary representation of the secure request context.

At step 620, the dehydration service 605 may de-serialize by converting the binary representation to recover an alphanumeric representation in accordance with a format for the secure request context to identify a secure request context envelope. The envelope may include: a context specifying access of the client to a set of databases; a signature generated using an asymmetric encryption key; and a message access code signature, among others. In de-serializing, the dehydration service 605 may validate the secure request context using the asymmetric encryption key used to generate the signature.

At step 625, the dehydration service 605 may defang the secure request context by modifying or replacing the signature generated using the asymmetric encryption key with a signature signed using a symmetric encryption key. At step 630, the dehydration service 605 may also generate an offline token to include a set of intended consumers (e.g., databases accessible by the client), a second message access code signature, and the defanged secure request context, among others. The dehydration service 605 may store the offline token onto a datastore.

Figure 6B:
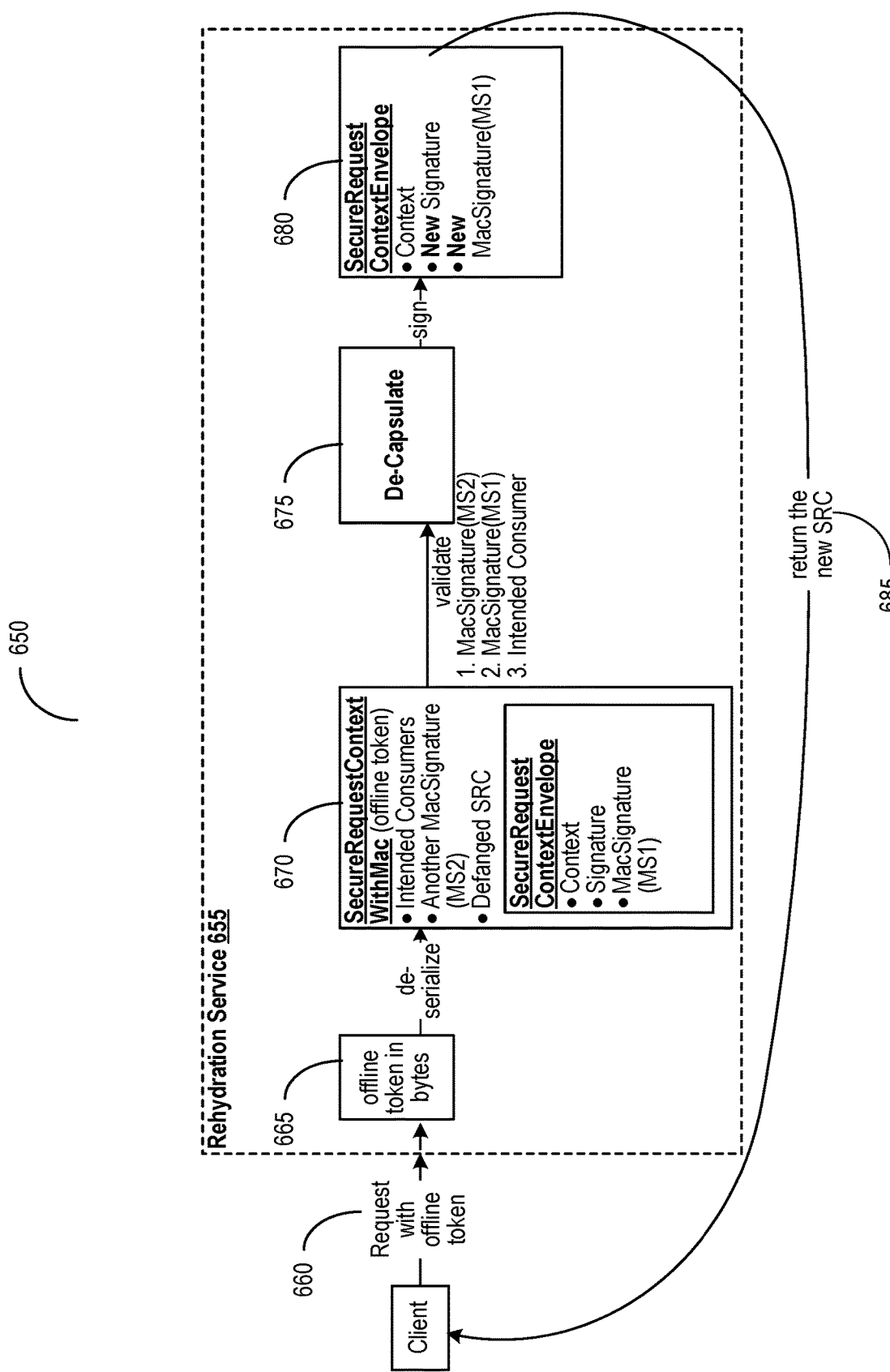
FIG. 6B illustrates a block diagram of a process for reactivating tokens to extend grant of access, in accordance with an embodiment.

FIG. 6B illustrates a block diagram of a process 650 for reactivating tokens to extend the grant of access. Embodiments may include additional, fewer, or different operations from those described in the process 650. The process 650 may be performed by a server executing machine-readable software code, though it should be appreciated that the various operations may be performed by one or more computing devices and/or processors, such as a rehydration service 655. Under the process 650, at step 660, the rehydration service 655 may receive a request with an offline token from a client. At step 665, the rehydration service 655 may unpack the request into a binary representation of the offline token.

At step 670, the rehydration service 655 may de-serialize by converting the binary representation to recover an alphanumeric representation in accordance with a format for the secure request context to extract the offline token. The offline token may include the set of intended consumers (e.g., databases accessible by the client), the second message access code signature, and the defanged secure request context, among others. The defanged secure request context may include the context, the defang signature (corresponding to the signature generated using the asymmetric encryption key), and a first message access code signature, among others.

At step 675, with the recovery, the rehydration service 655 may validate the two message access code signatures and the identification of the databases from the offline token using keys shared by the dehydration service 605. Upon validation, the rehydration service 655 may de-capsulate the offline token by extracting the secure request context from the offline token. At step 680, the rehydration service 655 may also generate a new signature using an encryption key of the rehydration service 655 and a new message access code signature using the shared key from the dehydration service 605. The rehydration service 655 may return the new secure request context envelope to the client.

Figure 7A:
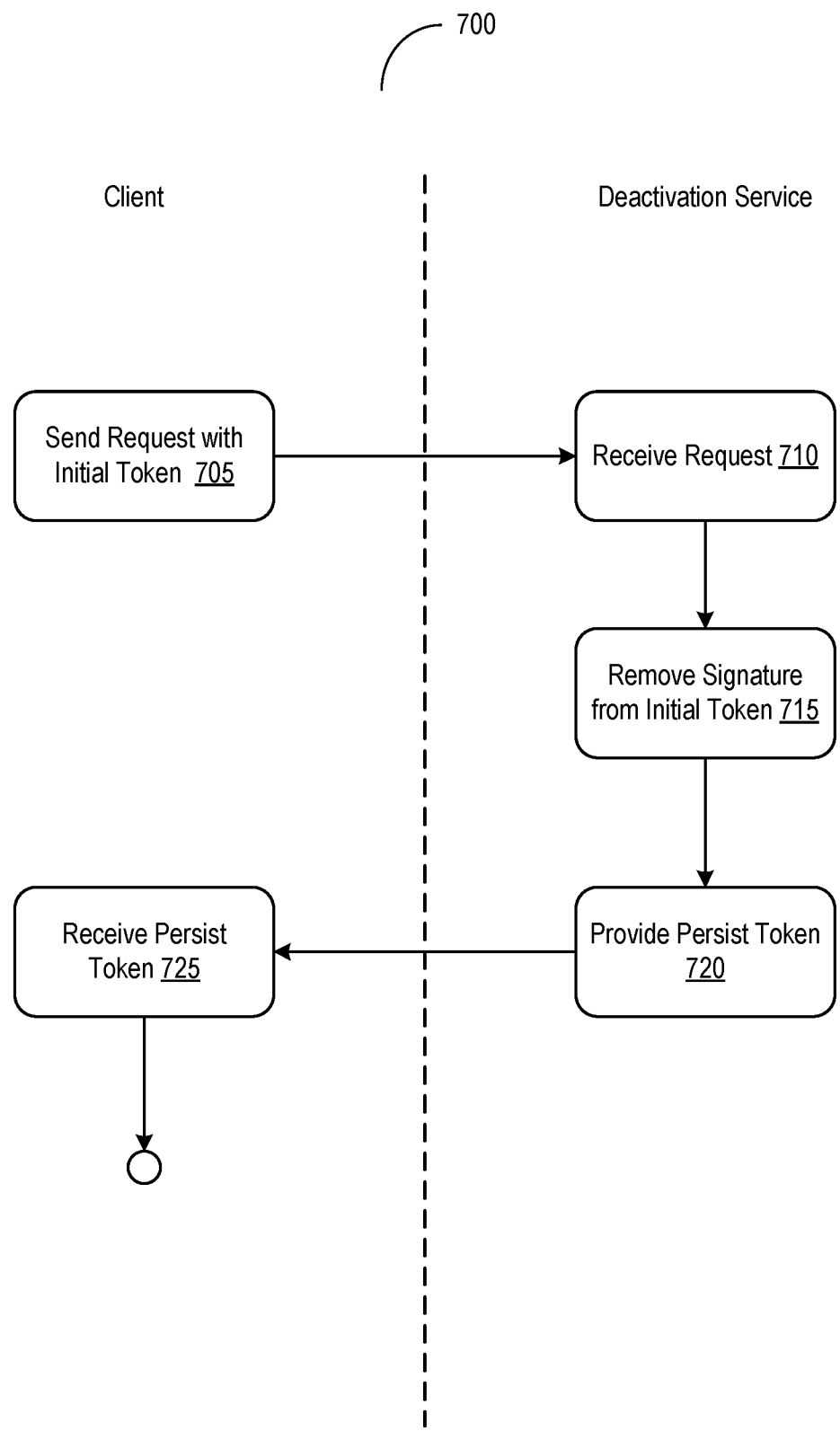
FIGS. 7A and 7B illustrate block diagrams of a method of generating tokens to grant clients access to data, in accordance with an embodiment.
Figure 7B:
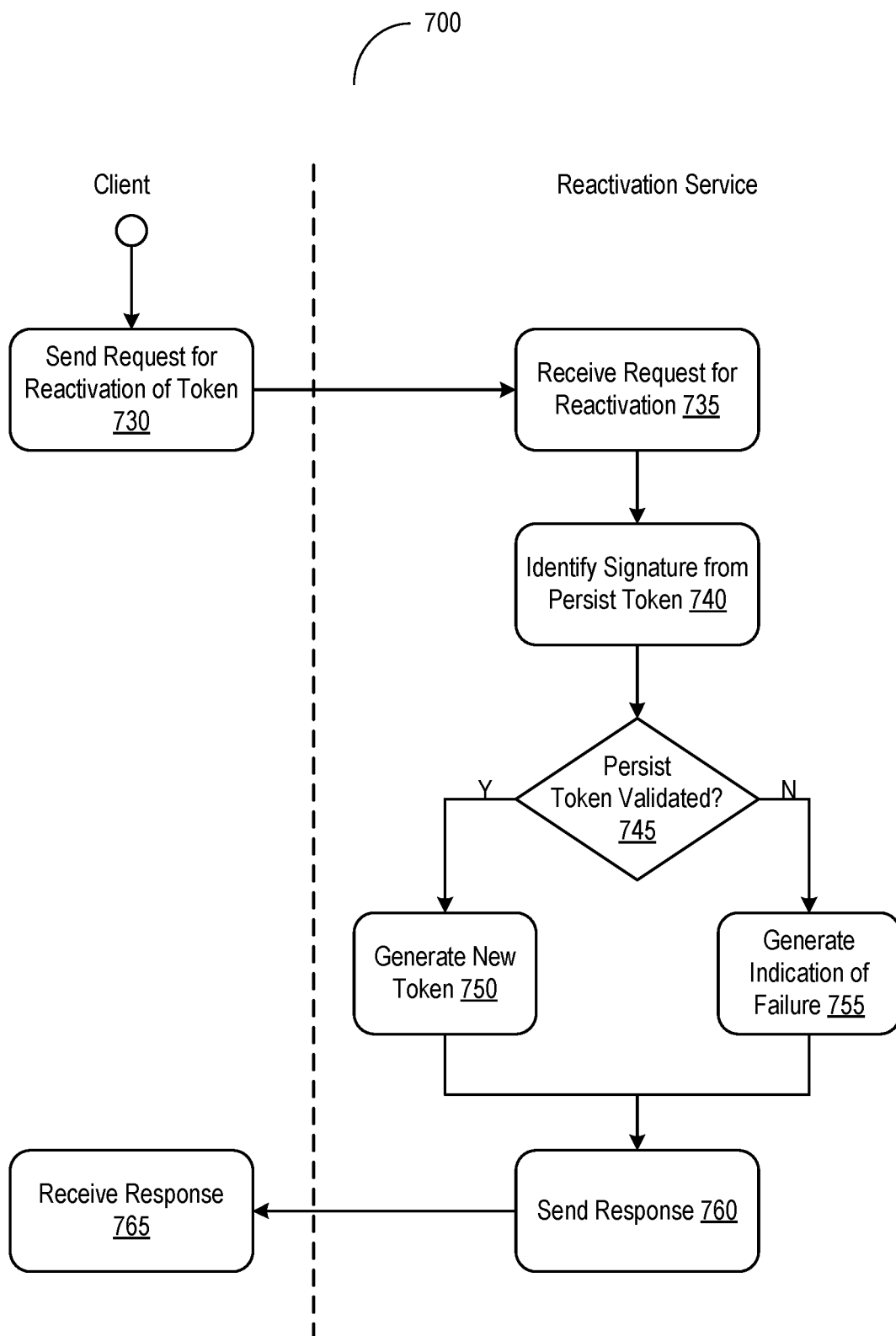

FIGS. 7A and 7B illustrate flow diagrams of a method 700 of generating tokens to grant clients access to data. Embodiments may include additional, fewer, or different operations from those described in the method 700. The method 700 may be performed by a server executing machine-readable software code, though it should be appreciated that the various operations may be performed by one or more computing devices and/or processors. At step 705, a client may send a request with an initial token to a deactivation service (also herein referred to as a second service). The initial token may identify or include a first signature generated using a symmetric encryption key, a second signature generated using an asymmetric encryption key, and context-defining attributes of the accessing of data on a set of databases for the client, among others.

At step 710, the deactivation service may, in turn, receive the request with the initial token from the client. Upon receipt, the deactivation service may parse the request to identify the initial token and parse the initial token to identify the first signature, the second signature, and the context, among others, from the initial token. With the identifications, the deactivation service may identify the second signature as generated using the asymmetric encryption key. At step 715, the deactivation service may remove the second signature identified as generated using the asymmetric encryption key from the initial token. With the removal, the deactivation service may create a persistent token derivative of the initial token. The deactivation service may generate a third signature by applying an encryption key shared with one or more trusted services (e.g., a reactivation service) to a portion of the initial token. The portion may include the first signature, the second signature, or the context. In addition, the deactivation service may add a set of identifiers corresponding to a set of databases to be accessed by the client. At step 720, the deactivation service may provide the persistent token to the client. At step 725, the client may, in turn, receive the persist token from the deactivation service.

At step 730, the client may send a request for reactivation of the persistent token to the reactivation service (also herein referred to as a first service). The request may include the persistent token provided by the deactivation service. At step 735, the reactivation service may, in turn, receive the request for reactivation from the client. With receipt, the reactivation service may parse the request to extract the persist token and may parse the persist token to identify the contents of the persist token. From the persist token, the reactivation service may identify the first signature, the third signature, and the set of identifiers to be accessed by the client. At step 740, the reactivation service may identify the third signature from the persist token. With the identification, the reactivation service may decrypt the third signature by applying the encryption key shared by the deactivation service to the third signature. Upon application, the reactivation service may identify whether the decryption of the third signature is successful. The identification of the successful decryption may be based on whether the context used to generate the third signature corresponds to the set of identifiers of the persist token.

At step 745, the reactivation service may determine whether the token is validated based on whether the decryption of the third signature is successful. If the decryption of the third signature is successful, the reactivation service may determine that the token is valid. Otherwise, if the decryption of the third signature is not successful, the reactivation service may determine that the token is not valid. At step 750, when the persist token is determined as valid, the reactivation service may generate a new token derivative of the persist token. In generating the new token, the reactivation service may generate a fourth signature using an encryption key of the reactivation service. The reactivation service may generate a fifth signature using the encryption key shared by the deactivation service. The reactivation service may include the context from the persist token to the new token. At step 755, when the persist token is determined as not valid, the reactivation service may generate an indication of the failure to validate. At step 760, the reactivation service may send a response to the client. When the validation of the persist token is successful, the response may include the newly generated token. In contrast, when the validation of the persist token is not successful, the response may include the indication of the failure to validate. At step 765, the client may receive the response from the reactivation service.

Figure 8A:
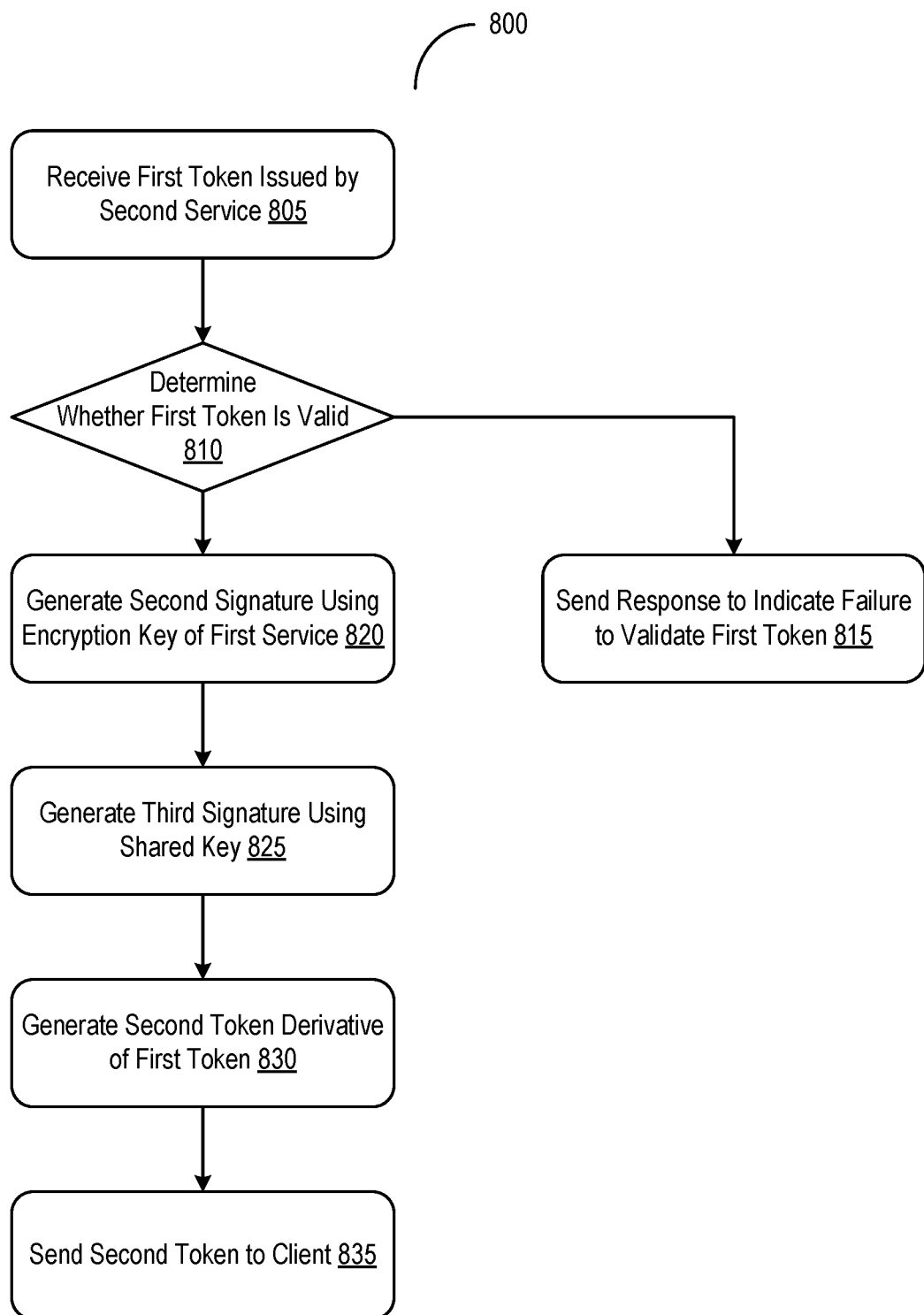
FIG. 8A illustrates a block diagram of a method of reactivating tokens to grant clients access to data, in accordance with an embodiment.

FIG. 8A illustrates flow diagrams of a method 800 of reactivating tokens to grant clients access to data. Embodiments may include additional, fewer, or different operations from those described in the method 800. The method 800 may be performed by a server executing machine-readable software code, though it should be appreciated that the various operations may be performed by one or more computing devices and/or processors. At step 805, a first service (e.g., the rehydration service) may receive a first token issued by a second service (e.g., an issuance service or dehydration service) to grant a client access to data on a plurality of databases prior to an expiration deadline. The first token may include (i) a first signature encrypted by the second service and (ii) an identification of the plurality of databases accessible using the first token, among others. In some embodiments, the first service may receive the first token, subsequent to removal by the second service of a third signature originally in the first token. In some embodiments, each database of the plurality of databases may correspond to a respective compartment of a plurality of compartments on a database layer.

At step 810, the first service may determine whether the first token is valid based on successful identification of the first signature decrypted from the first token using a shared key from the second service. The first service may apply the shared key from the second service on the first signature. If the identification of the first signature decrypted from the first token is successful, the first service may determine that the first token is valid. Otherwise, if the identification of the first signature decrypted from the first token is not successful, the first service may determine that the first token is invalid.

In some embodiments, the first service may determine whether a time elapsed since the issuance of the first token is within a threshold limit for reactivation. The threshold limit may be greater than at least the expiration time of the first token. When the elapsed time is within the threshold limit, the first gateway may determine that the first token is valid. When the elapsed time is outside the threshold limit, the first gateway may determine that the first token is invalid. At step 815, the first service may send a second indicating a failure to validate the first token for continued access of the data on the plurality of databases.

Responsive to determining that the first token is valid, at step 820, the first service may generate a second signature using an encryption key of the first service. The generation of the second signature may be in accordance with asymmetric or symmetric encryption. At step 825, the first service may generate a third signature using the shared key of the second service. The generation of the third signature may be in accordance with symmetric encryption. At step 830, the first service may generate a second token derivative of the first token, to include (i) the second signature of the first service, (ii) the third signature generated from the shared key of the second service, and (iii) the identification of the plurality of databases accessible using the second token. At step 835, the first service may send the second token to grant the client access to the data on the plurality of databases beyond the expiration deadline of the first token.

Figure 8B:
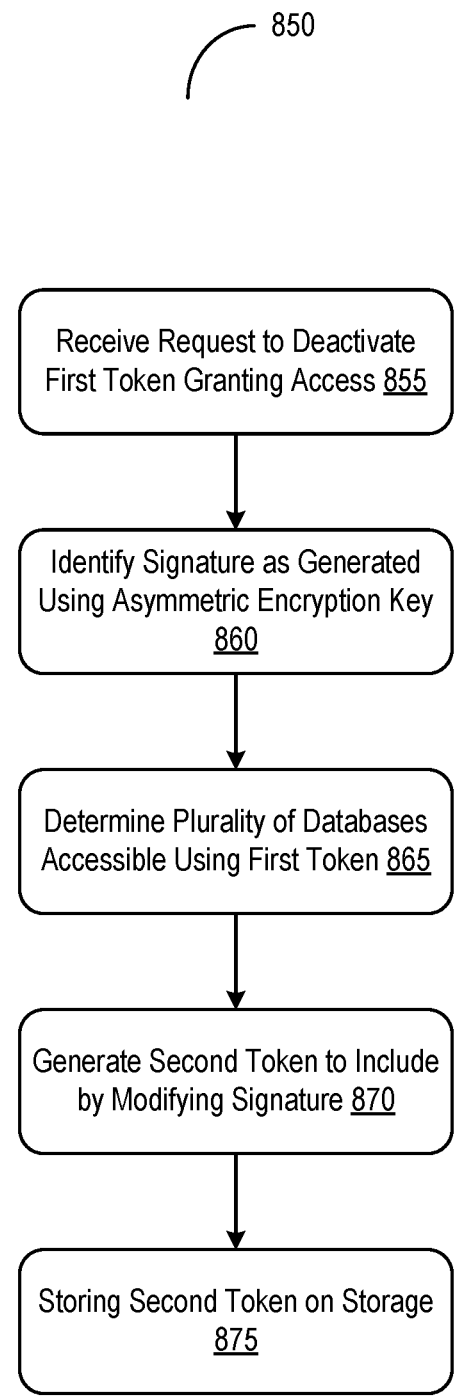
FIG. 8B illustrates a block diagram of a method of deactivating tokens granting clients access to data, in accordance with an embodiment.

FIG. 8B illustrates flow diagrams of a method 850 of deactivating tokens granting clients access to data. Embodiments may include additional, fewer, or different operations from those described in the method 850. The method 850 may be performed by a server executing machine-readable software code, though it should be appreciated that the various operations may be performed by one or more computing devices and/or processors. At step 855, a first service may receive a request to deactivate a first token granting a client access to data on a plurality of database. The first token may include: (i) a first signature generated using a symmetric encryption key and (ii) a second signature generated using an asymmetric encryption key. The first token may include (i) the expiration time defining a first length of time during which the plurality of databases is accessible using the first token and (ii) a threshold time limit greater than the expiration time defining a second length of time after which the first token is not extendable.

At step 860, the first service may identify, from the first token, the second signature as generated using the asymmetric encryption key. The first service may inspect the field-value pairs within the first token to identify the second signature. At step 865, the first service may determine, using the request, the plurality of databases accessible by the client using the first token. In some embodiments, the first service may determine the plurality of databases accessible by the client using the first token from the context included in the first token or the request. The context may include one or more attributes for accessing of the data elements on the databases by the client.

At step 870, the first service may generate a second token derivative of the first token by including (i) the first signature encrypted using the first key and (ii) an identification of the plurality of database. In generating the second token, the first service may modify the second signature identified as generated using the asymmetric encryption key. In some embodiments, the second token may also include the expiration time and the threshold time limit from the first token. At step 875, the first service may store the second token on a storage accessible to the client and the plurality of databases. The second token may include an expiration time configurable to be extended by a second service using a shared key.

By deactivating and reactivating tokens in this manner, the token may allow the client to access data on the databases beyond the initial expiration time of the token. An initial issuer may generate a token to include context in which the client is to access databases, a first signature generated using an asymmetric encryption key, and a second signature generated using a symmetric encryption key, among others. The token may also identify an initial expiration time. The asymmetric encryption key may correspond to a private encryption key generated at the initial issuer, and the public encryption key that is a pair to the private encryption key may be shared across multiple services to allow other services to authenticate.

To deactivate the token, a deactivation service may parse the token to disable or remove the first signature generated using the asymmetric encryption key. By removing the signature generated using the asymmetric encryption key, the token may be rendered deactivated, and unable to be used to access the databases. The removal also may serve to prevent the creation of fraudulent tokens with the same context. The deactivation service may also generate a third signature using a symmetric key (e.g., HMAC) to include into the deactivated token. In conjunction, the deactivation service may distribute or provide the symmetric key to share with other trusted services.

To reactivate and extend the use of the token, the client may provide the deactivated token to a trusted reactivation service. The trusted service may have received the shared key from the deactivation service to designate the service as trusted. Upon receipt, the reactivation service may validate the token using the shared key. When the deactivated token is successfully validated, the reactivation service may generate a new token with a new signature of the reactivate service as well a new signature generated using the shared key. In this manner, the utility of the token may be extended beyond the initial expiration time in a secure manner to prevent the usage of fraudulent tokens. Furthermore, from a human-computer interaction (HCI) perspective, the extension may reduce the frequency of having a user of the client enter an authentication credential each time the client is to access the data on the database.

Figure 9:
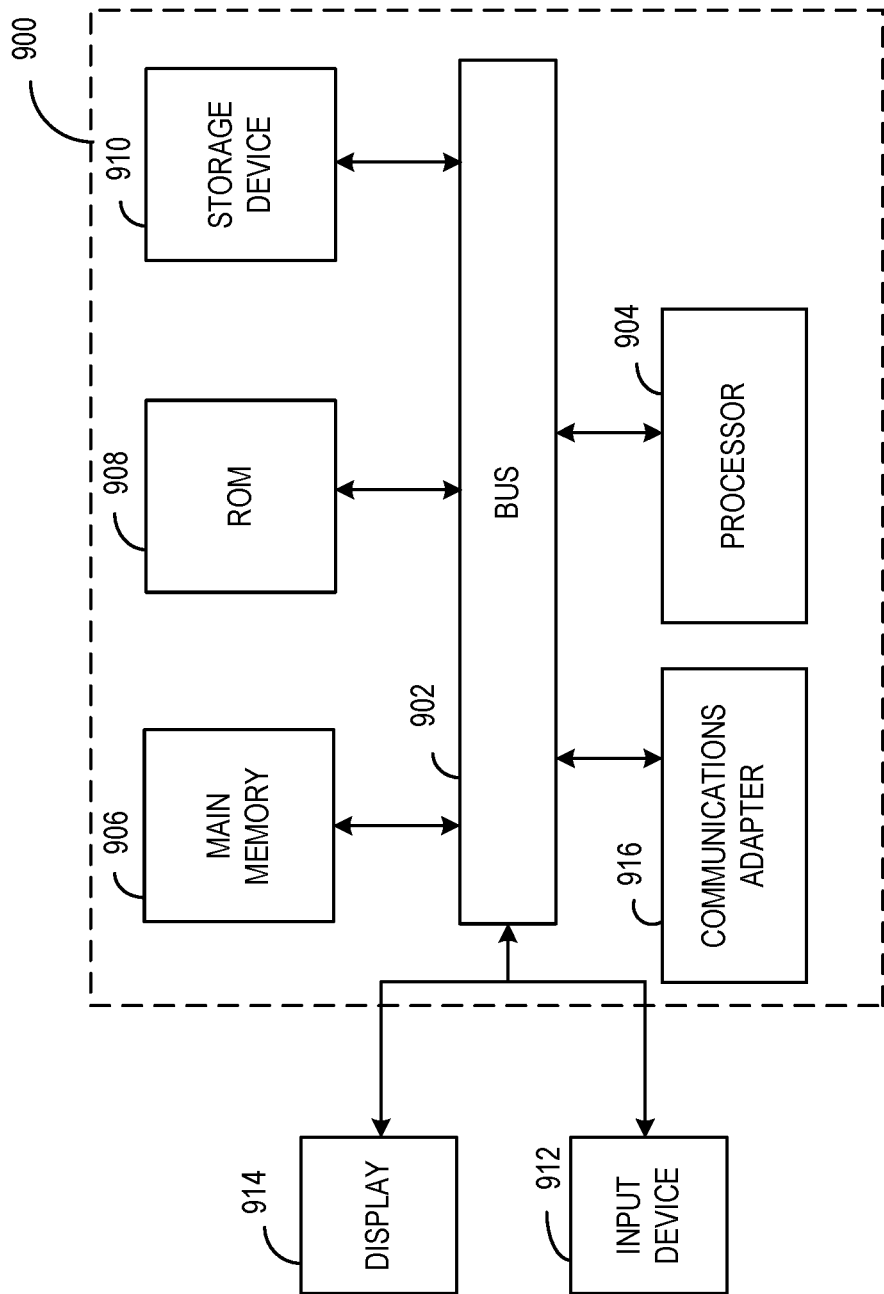
FIG. 9 illustrates a component diagram of an example computing system suitable for use in the various implementations described herein, in accordance with an embodiment.

FIG. 9 is a component diagram of an example computing system suitable for use in the various implementations described herein, according to an example implementation. One or more steps of the methods and processes discussed herein can be performed by the computing system depicted in FIG. 9. The computing system 900 includes a bus 902 or other communication component for communicating information and a processor 904 coupled to the bus 902 for processing information. The computing system 900 also includes main memory 906, such as a RAM or other dynamic storage device, coupled to the bus 902 for storing information, and instructions to be executed by the processor 904. Main memory 906 can also be used for storing position information, temporary variables, or other intermediate information during the execution of instructions by the processor 904. The computing system 900 may further include a ROM 908 or other static storage device coupled to the bus 902 for storing static information and instructions for the processor 904. A storage device 905, such as a solid-state device, magnetic disk, or optical disk, is coupled to the bus 902 for persistently storing information and instructions.

The computing system 900 may be coupled via the bus 902 to a display 914, such as a liquid crystal display, or active-matrix display, for displaying information to a user. An input device 912, such as a keyboard including alphanumeric and other keys, may be coupled to the bus 902 for communicating information, and command selections to the processor 904. In another implementation, the input device 912 has a touchscreen display. The input device 912 can include any type of biometric sensor, or a cursor control, such as a mouse, a trackball, or cursor direction keys, for communicating direction information and command selections to the processor 904 and for controlling cursor movement on the display 914.

In some implementations, the computing system 900 may include a communications adapter 916, such as a networking adapter. Communications adapter 916 may be coupled to bus 902 and may be configured to enable communications with a computing or communications network or other computing systems. In various illustrative implementations, any type of networking configuration may be achieved using communications adapter 916, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 900 in response to the processor 904 executing an implementation of instructions contained in main memory 906. Such instructions can be read into main memory 906 from another computer-readable medium, such as the storage device 910. Execution of the implementation of instructions contained in main memory 906 causes the computing system 900 to perform the illustrative processes described herein. One or more processors in a multi-processing implementation may also be employed to execute the instructions contained in the main memory 906. In alternative implementations, hard-wired circuitry may be used in place of or in combination with software instructions to implement illustrative implementations. Thus, implementations are not limited to any specific combination of hardware circuitry and software.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means, including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

Presented herein are examples of various embodiments described herein.

1. A method of authenticating clients to access to data via proxy layers, comprising:
   receiving, by a gateway on a proxy layer between an application layer and a database layer, a request from a client to access data in a compartment of plurality of compartments on the database layer, the request including (i) a context in which the client is to access the compartment and (ii) a token generated based at least on an encryption of an identifier of the compartment responsive to successful authentication of the request at the application layer;
   responsive to identifying the identifier decrypted from the token of the request corresponding to the compartment of the plurality of compartments, determining, by the gateway, that the client is authorized to access the data in the compartment on the database layer through the proxy layer;
   selecting, by the gateway, from a plurality of access permissions defined by the proxy layer to control access to database layer, at least one access permission for the client to access the compartment through the proxy layer based on the context of the request; and
   generating, by the gateway, to provide the client via the application layer, an indication that the client is authorized to access the data in the compartment on the database layer through the proxy layer in accordance with the at least one access permission.

2. The method of example 1, further comprising
   determining, by the gateway, that a second client is not authorized to access the data in the compartment through the proxy layer, responsive to identifying a second token of a second request from the second client as not corresponding to the compartment; and generating, by the gateway, to provide the second client via the application layer, an indication that second client is not authorized to access the data in in the compartment on the database layer.

3. The method of examples 1 or 2, wherein selecting the at least one access permission further comprises identifying the at least one access permission, based on an element in which the data is stored on the compartment of the database layer, and
wherein generating the response further comprises sending a response to indicate granting of the at least one access permission to the client in accessing the data in the compartment on the database.

4. The method of any one or more of the preceding examples, further comprising generating, by the gateway, a second token to include (i) the context, (ii) an encryption of the identifier of the compartment and (iii) an identifier of the client, responsive to determining that the client is authorized to access the data,
wherein generating the indication further comprise sending a response including the second token to grant the client access the data in the compartment on the database layer.

5. The method of any one or more of the preceding examples, further comprising:
extracting, by the gateway, the identifier from the token of the request by decrypting the identifier of the compartment using an encryption key shared between the application layer and the gateway layer; and
identifying, by the gateway, the identifier decrypted from the token as referencing the compartment of the plurality of compartments as identified by the context.

6. The method of any one or more of the preceding examples, further comprising determining, by the gateway, that the identifier decrypted from the token of the request references the compartment not associated with the gateway,
wherein determining that the client is authorized further comprises communicating the token with an external service to determine that the client is authorized to access the data in the compartment.

7. The method of any one or more of the preceding examples, wherein receiving the request further comprises receiving, via the application layer, the request including the token added to a header of the request responsive to the authentication of the request at the application layer.

8. The method of any one or more of the preceding examples, wherein selecting the at least one access permission further comprises identifying the at least one access permission, independent of any access permission granted at the application layer responsive to successful authentication of the request at the application layer.

9. The method of any one or more of the preceding examples, wherein the token is issued by a first service to access the plurality of compartments and is configured to have an expiration deadline extendable by a second service, by using a shared key between the first service and the second service.

10. The method of any one or more of the preceding examples, wherein each compartment of the plurality of compartments includes a plurality of elements, each element of the plurality of elements including at least one of (i) the identifier of the compartment to which the element belongs and (ii) an identifier of the gateway through which the element is to be accessed.

11. A system comprising one or more processors coupled with memory to perform any one or more of the preceding examples.

12. A non-transitory computer readable medium storing program instructions for causing one or more processors to execute any one or more of the examples 1-10.

13. A method of generating tokens to grant clients access to data, comprising:
receiving, by a first service, a first token issued by a second service to grant a client access to data on a plurality of databases prior to an expiration deadline, the first token including (i) a first signature encrypted by the second service and (ii) an identification of the plurality of databases accessible using the first token;
determining, by the first service, that the first token is valid based on successful identification of the first signature decrypted from the first token using a shared key from the second service;
responsive to determining that the first token is valid:
generating, by the first service, a second signature using an encryption key of the first service; and
generating, by the first service, a third signature using the shared key of the second service;
generating, by the first service, a second token derivative of the first token, to include (i) the second signature of the first service, (ii) the third signature generated from the shared key of the second service, and (iii) the identification of the plurality of databases accessible using the second token; and
sending, by the first service, the second token to grant the client access to the data on the plurality of databases beyond the expiration deadline of the first token.

14. The method of example 13, further comprising responsive to determining that a third token is invalid based on unsuccessful identification of a third signature from the third token using the shared key of the second service, sending, by the first service, a second response indicating a failure to validate the third token for continued access of the data on the plurality of databases.

15. The method of any one or more of examples 13 or 14, further comprising determining, by the first service, a time elapsed since the issuance of the first token is within a threshold limit for reactivation, the threshold limit greater than at least the expiration time of the first token; and
wherein generating the second token further comprises generating the second token, responsive to determining that the elapsed time is within the time limit for reactivation.

16. The method of any one or more of examples 13-15, wherein determining that the first token is valid further comprises determining that the first token is valid, responsive to identifying the second service as associated with the shared key used to identify the first signature.

17. The method of any one or more of examples 13-16, wherein receiving the first token further comprises receiving the first token, the first token including the first signature, subsequent to removal by the second service of a third signature originally in the first token.

18. The method of any one or more of examples 13-17, wherein each database of the plurality of databases corresponds to a respective compartment of a plurality of compartments on a database layer.

19. The method of any one or more of examples 13-18, wherein each of the first token and second token are configured to grant the client access to the data on the plurality of databases on a database layer via a proxy layer.

20. A system comprising one or more processors coupled with memory to perform any one or more of the preceding examples 13-19.

21. A non-transitory computer readable medium storing program instructions for causing one or more processors to execute any one or more of the preceding examples 13-19.

22. A method of deactivating tokens to control access to data, comprising:
   receiving, by a first service, a request to deactivate a first token granting a client access to data on a plurality of database, the first token including: (i) a first signature generated using a symmetric encryption key and (ii) a second signature generated using an asymmetric encryption key;
   identifying, by the first service, from the first token, the second signature as generated using the asymmetric encryption key;
   determining, by the first service, using the request, the plurality of databases accessible by the client using the first token;
   generating, by the first service, a second token derivative of the first token by including (i) the first signature encrypted using the first key and (ii) an identification of the plurality of database and by modifying the second signature identified as generated using the asymmetric encryption key; and
   storing, by the first service, the second token on a storage accessible to the client and the plurality of databases, the second token having an expiration time configurable to be extended by a second service using a shared key.

23. The method of example 22, further comprising sending, by the first service, the shared key to a plurality of trusted services including the second service, the second service configured to reactivate the second token using the shared key.

24. The method of any one or more of examples 22 or 23, wherein determining the plurality of databases further comprises identifying the plurality of databases from a context in which the client is to access the data on the plurality of databases.

25. The method of any one or more of examples 22-24, wherein generating the second token further comprises generating the shared key to include a third signature generated using the shared key.

26. A system comprising one or more processors coupled with memory to perform any one or more of the preceding examples 22-25.

27. A non-transitory computer readable medium storing program instructions for causing one or more processors to execute any one or more of the preceding examples 22-25.

What we claim is:

1. A method of authenticating clients to access to data via proxy layers, comprising:
   receiving, by a gateway on a proxy layer between an application layer and a database layer, a request from a client to access data in a compartment of plurality of compartments on the database layer, the request including (i) a context in which the client is to access the compartment and (ii) a token generated based at least on an encryption of an identifier of the compartment responsive to successful authentication of the request at the application layer;
   responsive to identifying the identifier decrypted from the token of the request corresponding to the compartment of the plurality of compartments, determining, by the gateway, that the client is authorized to access the data in the compartment on the database layer through the proxy layer;
   selecting, by the gateway, from a plurality of access permissions defined by the proxy layer to control access to database layer, at least one access permission for the client to access the compartment through the proxy layer based on the context of the request; and
   generating, by the gateway, to provide the client via the application layer, an indication that the client is authorized to access the data in the compartment on the database layer through the proxy layer in accordance with the at least one access permission.

2. The method of claim 1, further comprising:
   determining, by the gateway, that a second client is not authorized to access the data in the compartment through the proxy layer, responsive to identifying a second token of a second request from the second client as not corresponding to the compartment; and
   generating, by the gateway, to provide the second client via the application layer, an indication that second client is not authorized to access the data in in the compartment on the database layer.

3. The method of claim 1, wherein selecting the at least one access permission further comprises identifying the at least one access permission, based on an element in which the data is stored on the compartment of the database layer, and
   wherein generating the response further comprises sending a response to indicate granting of the at least one access permission to the client in accessing the data in the compartment on the database.

4. The method of claim 1, further comprising generating, by the gateway, a second token to include (i) the context, (ii) an encryption of the identifier of the compartment and (iii) an identifier of the client, responsive to determining that the client is authorized to access the data,
   wherein generating the indication further comprise sending a response including the second token to grant the client access the data in the compartment on the database layer.

5. The method of claim 1, further comprising:
   extracting, by the gateway, the identifier from the token of the request by decrypting the identifier of the compartment using an encryption key shared between the application layer and the gateway layer; and
   identifying, by the gateway, the identifier decrypted from the token as referencing the compartment of the plurality of compartments as identified by the context.

6. The method of claim 1, further comprising determining, by the gateway, that the identifier decrypted from the token of the request references the compartment not associated with the gateway,
   wherein determining that the client is authorized further comprises communicating the token with an external service to determine that the client is authorized to access the data in the compartment.

7. The method of claim 1, wherein receiving the request further comprises receiving, via the application layer, the request including the token added to a header of the request responsive to the authentication of the request at the application layer.

8. The method of claim 1, wherein selecting the at least one access permission further comprises identifying the at least one access permission, independent of any access permission granted at the application layer responsive to successful authentication of the request at the application layer.

9. The method of claim 1, wherein the token is issued by a first service to access the plurality of compartments and is configured to have an expiration deadline extendable by a second service, by using a shared key between the first service and the second service.

10. The method of claim 1, wherein each compartment of the plurality of compartments includes a plurality of elements, each element of the plurality of elements including at least one of (i) the identifier of the compartment to which the element belongs and (ii) an identifier of the gateway through which the element is to be accessed.

11. A system authenticating clients to access to data via proxy layers, comprising:
 a gateway having one or more processors coupled with memory, the gateway on a proxy layer between an application layer and a database layer, the gateway configured to:
  receive a request from a client to access data in a compartment of plurality of compartments on the database layer, the request including (i) a context in which the client is to access the compartment and (ii) a token generated based at least on an encryption of an identifier of the compartment responsive to successful authentication of the request at the application layer;
  responsive to identifying the identifier decrypted from the token of the request corresponding to the compartment of the plurality of compartments, determine that the client is authorized to access the data in the compartment on the database layer through the proxy layer;
  select, from a plurality of access permissions defined by the proxy layer to control access to database layer, at least one access permission for the client to access the compartment through the proxy layer based on the context of the request; and
  generate, to the client via the application layer, an indication that the client is authorized to access the data in the compartment on the database layer through the proxy layer in accordance with the at least one access permission.

12. The system of claim 11, wherein the gateway is further configured to:
 determine that a second client is not authorized to access the data in the compartment through the proxy layer, responsive to identifying a second token of a second request from the second client as not corresponding to the compartment; and
 generate, to provide the second client via the application layer, an indication that second client is not authorized to access the data in in the compartment on the database layer.

13. The system of claim 11, wherein the gateway is further configured to:
 identify the at least one access permission, based on an element in which the data is stored on the compartment of the database layer; and
 send a response to indicate granting of the at least one access permission to the client in accessing the data in the compartment on the database.

14. The system of claim 11, wherein the gateway is further configured to:
 generate a second token to include (i) the context, (ii) an encryption of the identifier of the compartment and (iii) an identifier of the client, responsive to determining that the client is authorized to access the data; and
 send a response including the second token to grant the client access the data in the compartment on the database layer.

15. The system of claim 11, wherein the gateway is further configured to
 extract the identifier from the token of the request by decrypting the identifier of the compartment using an encryption key shared between the application layer and the gateway layer; and
 identify the identifier decrypted from the token as referencing the compartment of the plurality of compartments as identified by the context.

16. The system of claim 11, wherein the gateway is further configured to
 determine that the identifier decrypted from the token of the request references the compartment not associated with the gateway, and
 communicate the token with an external service to determine that the client is authorized to access the data in the compartment.

17. The system of claim 11, wherein the gateway is further configured to receive, via the application layer, the request including the token added to a header of the request responsive to the authentication of the request at the application layer.

18. A non-transitory computer readable medium storing program instructions for causing one or more processors to:
 receive, on a proxy layer between an application layer and a database layer, a request from a client to access data in a compartment of plurality of compartments on the database layer, the request including (i) a context in which the client is to access the compartment and (ii) a token generated based at least on an encryption of an identifier of the compartment responsive to successful authentication of the request at the application layer;
 responsive to identifying the identifier decrypted from the token of the request corresponding to the compartment of the plurality of compartments, determine that the client is authorized to access the data in the compartment on the database layer through the proxy layer;
 select, from a plurality of access permissions defined by the proxy layer to control access to database layer, at least one access permission for the client to access the compartment through the proxy layer based on the context of the request; and
 generate, to the client via the application layer, an indication that the client is authorized to access the data in the compartment on the database layer through the proxy layer in accordance with the at least one access permission.

19. The non-transitory computer readable medium of claim 18, wherein the instructions cause the one or more processors to:
 determine that a second client is not authorized to access the data in the compartment through the proxy layer, responsive to identifying a second token of a second request from the second client as not corresponding to the compartment; and
 generate, to provide the second client via the application layer, an indication that second client is not authorized to access the data in in the compartment on the database layer.

20. The non-transitory computer readable medium of claim 18, wherein the instructions cause the one or more processors to:
 identify the at least one access permission, based on an element in which the data is stored on the compartment of the database layer; and send a response to indicate granting of the at least one access permission to the client in accessing the data in the compartment on the database.

\* \* \* \* \*